United States Patent
Mori

(10) Patent No.: US 7,653,312 B2
(45) Date of Patent: Jan. 26, 2010

(54) MULTIPLE BIT RATE OPTICAL COMMUNICATION METHOD, OPTICAL NETWORK UNIT AND OPTICAL LINE TERMINAL

(75) Inventor: Kazuyuki Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 470 days.

(21) Appl. No.: 11/737,207

(22) Filed: Apr. 19, 2007

(65) Prior Publication Data

US 2008/0056721 A1  Mar. 6, 2008

(30) Foreign Application Priority Data

Sep. 1, 2006  (JP) .............................. 2006-237806

(51) Int. Cl.
*H04J 14/08* (2006.01)

(52) U.S. Cl. .............................. 398/100; 398/66; 398/99

(58) Field of Classification Search ................... 398/63, 398/66, 67, 98, 99, 100, 101, 102, 103
See application file for complete search history.

(56) References Cited

U.S. PATENT DOCUMENTS

| 5,517,232 A * | 5/1996 | Heidemann et al. ........... 725/98 |
| 5,790,287 A * | 8/1998 | Darcie et al. ................. 398/108 |
| 2006/0133809 A1* | 6/2006 | Chow et al. ................... 398/66 |

FOREIGN PATENT DOCUMENTS

JP  8-8954  1/1996

* cited by examiner

Primary Examiner—Christina Y Leung
(74) Attorney, Agent, or Firm—Staas & Halsey LLP

(57) ABSTRACT

The present invention is a method of transmitting data of different bit rates in a simple manner and, if positive minimal multiples whose multiple operation values on the bit time lengths 1/Ai for a plurality of communication bit rates Ai become common are minimal multiples ai respectively, an optical line terminal constitutes a time division multiplex signal composed of a first data area having a bit rate Ai/ai and including frame synchronization information and a second data area in which packets addressed to each optical network unit of the bit rate Ai are time division multiplexed, and transmits the time division multiplex signal to a plurality of optical network units via a branching/multiplexing means.

14 Claims, 12 Drawing Sheets

MULTIPLE BIT RATE OPTICAL COMMUNICATION METHOD, OPTICAL NETWORK UNIT AND OPTICAL LINE TERMINAL

BACKGROUND OF THE INVENTION

1) Field of the Invention

The present invention relates to a multiple bit rate optical communication method, an optical network unit and an optical line terminal, and relates, for example, to a technique suitable for use in a system in which a passive optical network (PON) is adopted.

2) Description of the Related Art

At present, as a subscriber optical fiber network system intended for subscriber homes such as ordinary households, for example, a system connecting an optical line terminal provided in a regional office set up in a central office or the like and optical network units set up in a plurality of subscriber homes using optical fibers is known. Among others, a configuration in which one optical fiber performing input/output of optical data signals from a regional office is branched off in a plurality of destinations by a power splitter, which is a passive element, and an optical network unit of each subscriber home is connected to each of the branched optical fibers is called a passive optical network (PON).

The PON system has been commercially available as a system that can perform data transmission at high speed between an optical line terminal and a plurality of optical network units.

Then, a system configuration shown, for example, in FIG. 12 can be cited as a form of communication network using the PON system.

A PON system 100 shown in FIG. 12 is comprised of an optical line terminal (OLT) 101, N (N is an integer equal to or greater than 2) optical network units (ONU) 102-1 to 102-N (denoted simply as an ONU 102 if not to be distinguished) corresponding to N subscribers #1 to #N a power splitter 104, an optical fiber 103 connecting the OLT 101 and the power splitter 104, and optical fibers 105-1 to 105-N (denoted simply as an optical fiber 105 if not to be distinguished) connecting the power splitter 104 and each of the ONU 102-1 to 102-N.

In the PON system 100, the OLT 101 is a device equipped with required communication control functions such as converting an electric signal into an optical signal to transmit the optical signal to the ONU 102 side in a predetermined downstream frame format and converting data transmitted as an optical signal from the ONU 102 in a predetermined upstream frame format into an electric signal for information delivery and the like.

The optical fiber 103 connected to the OLT 101 is branched off by the power splitter 104 provided midway through a transmission path and each branched optical fiber 105 is drawn into an individual subscriber home to be connected to each ONU 102.

The ONU 102 is a device that performs communication control operations such as communication with the OLT 101 and conversion between optical signals and electric signals.

Here, upstream and downstream data transmission between the OLT 101 and power splitter 104 is performed in both directions by wavelength division multiplexing (WDM) using one optical fiber 103. Meanwhile, a direction from the OLT 101 to the ONU 102 is downstream and that from the ONU 102 to the OLT 101 is upstream.

A downstream frame from the OLT 101 to the ONU 102, for example, is transmitted using time division multiplexing (TDM) as an optical signal in a 1.49 μm band at a single bit rate A, and frame synchronization information and management information in the downstream frame are detected by the ONU 102 to extract, based on the detected information, data in time slots individually assigned in advance. An upstream frame from the ONU 102 to the OLT 101, on the other hand, is transmitted from the ONU 102 in a timing provided by the OLT 101. That is, an upstream frame from each ONU 102 is transmitted using time division multiple access (TDMA) as an optical signal in the 1.31 μm band in a timing so that collision of upstream frames can be avoided.

The power splitter 104 plays a role of dividing a downstream frame from one optical fiber 103 to a plurality of optical fibers 105 (power branching) and collecting (multiplexing) upstream frames from the plurality of optical fibers 105 into one optical fiber 103.

Meanwhile, the PON system 100 has generally been under study for use to provide low-speed services such as a phone service. In recent years, however, to provide high-speed communication services such as a video phone service and a TV conference service that are faster than the phone service is increasingly demanded, and to provide low bit rate data (low-speed services such as the phone service) and high bit rate data (high-speed services such as the video phone service and TV conference service) by one PON system 100 is called for.

Japanese Patent Application Laid-Open No. 8-8954 shown below, for example, discloses a method of increasing service capacities in a point/multipoint optical transmission system that realizes an increase in service capacities by using a multi-rate/burst circuit that generates a signal having a different rate for each time slot.

According to the above technique, all ONUs 102 are equipped with the multi-rate/burst circuit in advance to provide low bit rate data and high bit rate data by one PON system and extension not only to low-speed services, but also to high-speed services is enabled by assigning a different transmission speed (bit rate) to a portion of time slots assigned to one ONU 102.

However, the method described in Japanese Patent Application Laid-Open No. HEI 8-8954 is incompatible with existing systems, because existing systems such as a gigabit-capable passive optical network (G-PON) standardized by ITU (International Telecommunication Union) do not adopt a transmission method in which the bit rate is changed for each service in a physical layer.

Here, the above Japanese Patent Application Laid-Open No. 8-8954 neither considers nor suggests compatibility with existing systems described above.

Moreover, since the technology described in the above Japanese Patent Application Laid-Open No. 8-8954 requires preparations (installation) of the multi-rate/burst circuit in all ONUs 102 in advance, even subscribers who do not want high-speed services must upgrade the ONU (such as installing the multi-rate/burst circuit), posing a problem of more complicated device upgrade and a burden of costs thereof.

SUMMARY OF THE INVENTION

The present invention has been developed in view of such problems and an object thereof is to enable, in a PON system or the like, transmission of data of different bit rates together in a simple manner while reducing upgrade costs of ONU and manpower required for upgrades and also ensuring compatibility with existing systems.

(1) Thus, a multiple bit rate optical communication method according to the present invention is a multiple bit rate optical communication method in an optical communication system having an optical line terminal, a plurality of optical network units, and a branching/multiplexing means for branching an optical signal from the optical line terminal to the plurality of optical network units and for multiplexing optical signals from the plurality of optical network units for output to the optical line terminal in which k [k is an integer equal to or greater than 2] different communication bit rates Ai [i=1, ..., k] set for the plurality of optical network units exist, characterized in that the optical line terminal constitutes a time division multiplex optical signal composed of a first data area having, if positive minimal multiples whose multiple operation values on the bit time lengths 1/Ai for the plurality of communication bit rates Ai become common are minimal multiples ai respectively, a bit rate Ai/ai and including frame synchronization information and a second data area in which packets of the communication bit rate Ai addressed to each optical network unit are time division multiplexed and transmits the time division multiplex optical signal to the plurality of optical network units via the branching/multiplexing means, and at the same time, each of the plurality of optical network units performs reception processing of content of the first data area of the time division multiplex optical signal from the branching/multiplexing means in an ai-bit cycle corresponding to the bit rate set for the optical network unit and detects the frame synchronization information in the first data area, and based on the detected frame synchronization information, performs reception processing of packets addressed to a relevant optical subscriber in the second data area of the time division multiplex optical signal in bits.

(2) Also, each optical network unit may read the first data area in units of a number of bits of the ai corresponding to the bit rate Ai set for the optical network unit after identifying the time division multiplex optical signal at the communication bit rate Ai set for the optical network unit and converting the optical signal to a digital electric signal.

(3) Further, the optical line terminal can assign a receiving timing of packets addressed to each optical network unit in the second data area by each optical network unit so that the receiving timing becomes a timing synchronized with a clock frequency corresponding to a value obtained by dividing the communication bit rate Ai by the ai through the frame synchronization information included in the first data area of the time division multiplex optical signal.

(4) Also, management information instructing a transmit timing of an optical signal from each of the plurality of optical network units to the optical line terminal may be included in the first data area of the time division multiplex optical signal so that each of the plurality of optical network units transmits an optical signal of the set communication bit rate Ai to the optical line terminal via the branching/multiplexing means in the transmit timing assigned by the optical line terminal through the management information, the optical line terminal establishes bit synchronization with each of optical signals from the plurality of optical network units transmitted via the branching/multiplexing means in the receiving timing corresponding to the transmit timing of the optical network unit in the management information and performs received signal processing of each of the optical signals from the plurality of optical network units with which the bit synchronization has been established at the corresponding communication bit rate Ai.

(5) In this case, both a time slot for each optical network unit assigned to the time division multiplex optical signal from the optical line terminal and an optical signal transmitted from each optical network unit can be made a packet with the number of bits obtained by multiplying the minimal multiple ai at the communication bit rate Ai set for the optical network unit by any natural number.

(6) Also, the optical line terminal can assign the transmit timing of optical signals from each optical network unit to the optical line terminal as well as the receiving timing of packets addressed to each optical network unit in the second data area by each optical network unit so that both the timings become a timing synchronized with the clock frequency corresponding to a value obtained by dividing the communication bit rate Ai by the ai through the frame synchronization information and the management information included in the first data area of the time division multiplex optical signal.

(7) Further, the optical line terminal may sequentially assign the transmit timing of optical signals from the plurality of optical network units to the optical line terminal by inserting an interval of a time period obtained by multiplying a common multiple operation value ai/Ai to the bit time length 1/Ai by any natural number as a guard time.

(8) Also, the optical line terminal establishes the bit synchronization with each of the optical signals transmitted from the plurality of optical network units via the branching/multiplexing means in a timing synchronized with the clock frequency corresponding to a value obtained by dividing the communication bit rate Ai by the ai and performs the received signal processing of each of the optical signals from the plurality of optical network units for which the bit synchronization has been established at the corresponding communication bit rate Ai.

(9) Also, a multiple bit rate optical communication method according to the present invention is a multiple bit rate optical communication method in an optical communication system having an optical line terminal, a plurality of optical network units, and a branching/multiplexing means for branching an optical signal from the optical line terminal to the plurality of optical network units and for multiplexing optical signals from the plurality of optical network units for output to the optical line terminal in which k [k is an integer equal to or greater than 2] different communication bit rates Ai [i=1, ..., k], which are not related to each other as multiples of natural numbers, set for the plurality of optical network units exist, characterized in that the optical line terminal constitutes a time division multiplex optical signal composed of a first data area into which signals having the bit rate Ai addressed to the plurality of optical network units are input and, after performing a rate conversion of signals addressed to an optical network unit to which at least one bit rate Aj [j∈i] belonging to the bit rates Ai of the input signals is set to the bit rate Atj so that bit rates of signals transmitted to the plurality of optical network units are related to each other as multiples of natural numbers, including frame synchronization information and a second data area in which packets addressed to each optical network unit of the communication bit rates Ai [i≠j] and Atj, which are now related to each other as multiples of natural numbers, are time division multiplexed and transmits the time division multiplex optical signal to the plurality of optical network units via the branching/multiplexing means, and at the same time, each of the plurality of optical network units performs reception processing of content of the first data area of the time division multiplex optical signal from the branching/multiplexing means at a bit rate corresponding to a common divisor of values of the communication bit rates Ai [i≠j] and Atj, which are now related to each other as multiples of natural numbers, and detects the frame synchronization information in the first data area, and based on the detected frame synchronization information, performs reception processing of packets addressed to the relevant optical subscriber in the second data area of the time division multiplex optical signal in bits at the set communication bit rates Ai [i≠j] and Atj, while the optical network units that have performed the reception processing of packets whose rate had been converted to the bit rate Atj in the optical line terminal convert the rate of the packets of the bit rate Atj to their original bit rate Aj.

(10) In this case, management information instructing a transmit timing of an optical signal from each of the plurality of optical network units to the optical line terminal may be included in the first data area of the time division multiplex optical signal and when transmitting optical signals from the plurality of optical network units to the optical line terminal, after making bit rates of signals transmitted from the plurality of optical network units to the optical line terminal related to each other as multiples of natural numbers by converting, in an optical network unit to which at least one bit rate Aj [j∈i] belonging to the bit rates Ai is set, the bit rate Aj of data to be transmitted to the optical line terminal to the bit rate Atj, each of the plurality of optical network units transmits an optical signal at the communication bit rate Ai [i≠j] or Atj to the optical line terminal via the branching/multiplexing means in the transmit timing assigned by the optical line terminal through the management information, while the optical line terminal establishes bit synchronization with each of signals transmitted as an optical signal from the plurality of optical network units via the branching/multiplexing means in a receiving timing corresponding to the transmit timing of the optical network unit in the management information and also performs received signal processing of each of the signals from the plurality of optical network units for which the bit synchronization has been established at the corresponding communication bit rate Ai [i≠j] or Atj and at the same time, regarding signals for which rate conversion to the bit rate Atj had been performed in the optical network unit among signals for which reception processing has been performed, a rate reconversion of such signals can be performed from the bit rate Atj to the original bit rate Aj.

(11) Also, an optical line terminal according to the present invention is the optical line terminal in the optical communication system in (1) and comprises a multiple signal constituting part constituting a time division multiplex optical signal composed of a first data area having, if positive minimal multiples whose multiple operation values on the bit time lengths 1/Ai for the plurality of communication bit rates Ai become common are minimal multiples ai respectively, the bit rate Ai/ai and including frame synchronization information, and a second data area in which packets addressed to each optical network unit of the communication bit rate Ai are time division multiplexed, and a transmission part transmitting the time division multiplex optical signal constituted by the multiple signal constituting part to the plurality of optical network units via the branching/multiplexing means.

(12) Further, an optical network unit according to the present invention is the optical network unit in the optical communication system in the above (1) having the optical line terminal in the above (11), and comprises a synchronization information detecting part which performs reception processing of content in the first data area of the time division multiplex optical signal input from the optical line terminal via the branching/multiplexing means in the ai-bit cycle corresponding to the bit rate Ai set for the optical network unit and detects the frame synchronization information in the first data area and a reception processing part which performs, based on the frame synchronization information detected by the synchronization information detecting part, reception processing of packets addressed to the optical subscriber in the second data area of the time division multiplex optical signal in bits.

(13) Also, an optical line terminal according to the present invention is the optical line terminal in the optical communication system in the above (9), and comprises a rate conversion part into which signals having the bit rate Ai addressed to the plurality of optical network units are input and by which bit rates of signals transmitted to the plurality of optical network units are made to be related to each other as multiples of natural numbers by performing a rate conversion of signals addressed to an optical network unit to which at least one bit rate Aj [j∈i] belonging to the bit rates Ai of the input signals is set to a bit rate Atj, a multiple signal constituting part constituting a time division multiplex optical signal composed of a first data area including frame synchronization information and a second data area in which packets addressed to each optical network unit of the communication bit rates Ai [i≠j] and Atj, which are now related to each other as multiples of natural numbers by the rate conversion in the rate conversion part, are time division multiplexed, and a transmission part transmitting the time division multiplex optical signal constituted by the multiple signal constituting part to the plurality of optical network units via the branching/multiplexing means.

(14) Further, an optical network unit according to the present invention is the optical network unit in the optical communication system in the above (9) having the optical line terminal in the above (13), and comprises a synchronization information detecting part which performs reception processing of content in the first data area of the time division multiplex optical signal input from the optical line terminal via the branching/multiplexing means at a bit rate corresponding to a common divisor of values of the communication bit rates Ai [i≠j] and Atj, which are now related to each other as multiples of natural numbers, and detects the frame synchronization information in the first data area, a reception processing part which performs, based on the detected frame synchronization information, reception processing of packets addressed to the relevant optical subscriber in the second data area of the time division multiplex optical signal at the set communication bit rates Ai [i≠j] and Atj in bits, and a rate reconversion part which performs a rate conversion of packets whose rate conversion to the bit rate Atj has been performed in the optical line terminal to their original bit rate Aj in the optical network unit which has performed the reception processing.

According to the present invention, as described above, even when optical network units for which a single bit rate A1 is first set are accommodated and an optical network unit for which a bit rate A2 that is not related to the bit rate A1 as a multiple of a natural number and is different from the bit rate A1 is additionally accommodated, or existing optical network units are adapted to receive at the bit rate A2, particularly a signal transmit timing from optical network units in an upstream transmission direction and a receiving timing in the optical line terminal can easily be matched while eliminating a need for special specification changes of optical network units and those whose bit rate is not changed so that system construction can be made easier. That is, advantages of being able to transmit data of different bit rates together in a simple manner while reducing upgrade costs of the optical network units and manpower required for upgrades and also ensuring compatibility with existing systems can be obtained.

DESCRIPTION OF THE PREFERRED EMBODIMENTS

Embodiments of the present invention will be described below with reference to drawings.

However, the present invention is not limited to such embodiments. In addition to the above object of the present invention, other technical problems, means for solving such technical problems, and operation effects will also become clear by disclosure of embodiments shown below.

[A] Description of the First Embodiment

Figure 1:
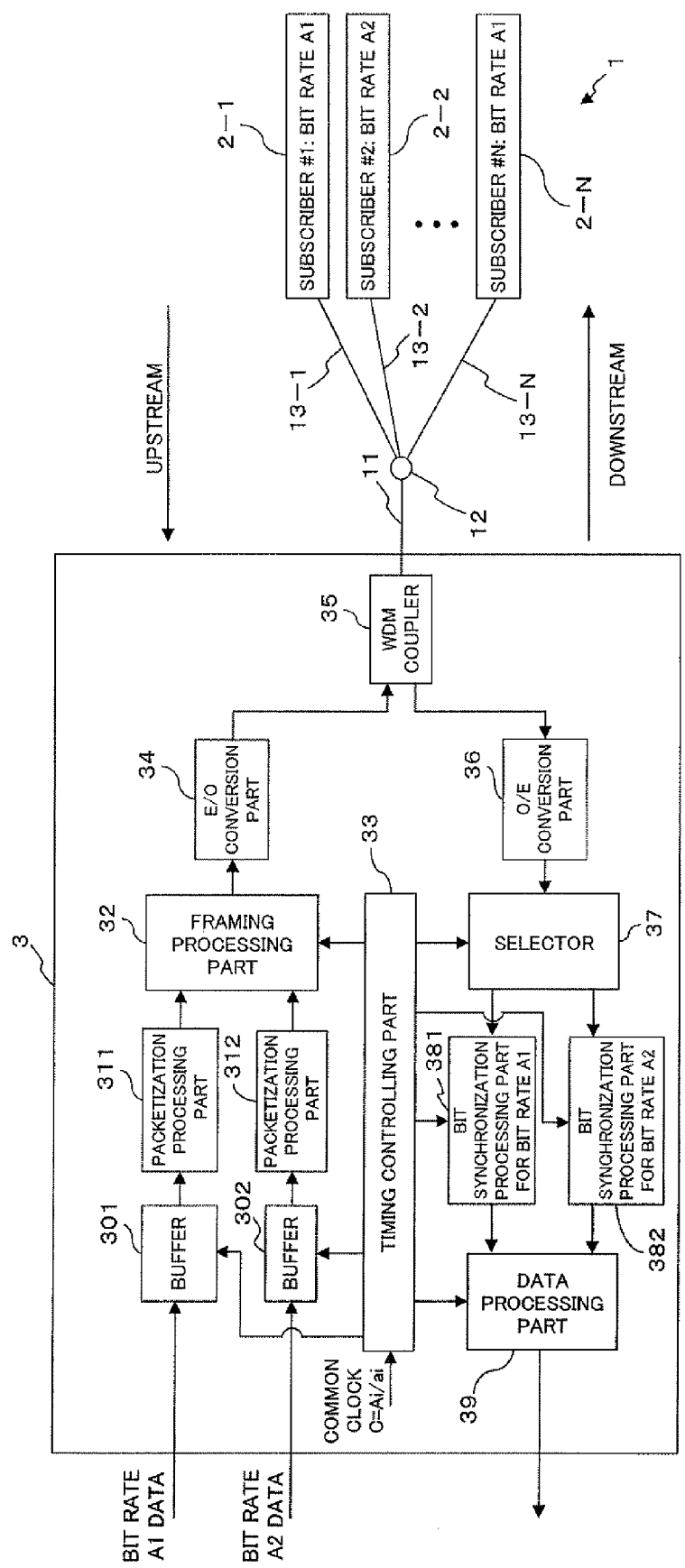
FIG. 1 is a block diagram showing a PON system in a first embodiment of the present invention together with a configuration of principal parts of an optical line terminal (OLT)

FIG. 1 is a block diagram showing the configuration of principal parts of a PON system (multiple bit rate optical communication system) according to an embodiment of the present invention. A PON system 1 shown in FIG. 1 is comprised of an optical line terminal (hereinafter referred to as an OLT) 3, N (N is an integer equal to or greater than 2) optical network units (hereinafter referred to as an ONU) 2-1 to 2-N (denoted simply as an ONU 2 if not to be distinguished) corresponding to N subscribers #1 to #N, a branching/multiplexing coupler 12, an optical fiber 11 connecting the OLT 3 and the branching/multiplexing coupler 12, optical fibers 13-1 to 13-N (denoted simply as an optical fiber 13 if not to be distinguished) connecting the branching/multiplexing coupler 12 and each ONU 2-1 to 2-N.

Here, at least one communication bit rate of a plurality (k) of communication bit rates Ai (i=1, . . . , k; k is an integer equal to or greater than 2, k=2 in the present embodiment) is set for each ONU 2 and data packets of the set communication bit rate are transmitted and received between each ONU 2 and the OLT 3. In the present embodiment, for example, the ONU 2-1 and ONU 2-3 to 2-N for which a bit rate A1 of a 1 GbE signal is set for the subscribers #1 and #3 to #N accommodated in a 1 GbE [Gigabit Ethernet®] system and the ONU 2-2 for which a bit rate A2 of a 10 GbE signal is set for the subscriber #2 accommodated in a 10 GbE system are provided as the ONU 2.

Then, the OLT 3 can communicate optical signals having multiple communication bit rates with the ONU 2 in accordance with the communication bit rate Ai set for each ONU 2.

In this case, the OLT 3 can communicate optical signals including not only 1 GbE signals, but also 10 GbE signals with the ONU 2.

The 1 GbE signal described above is generated by performing 8B10B coding on a signal having the bit rate of 1 Gb/s and the communication bit rate A1 thereof is 1 Gb/s×10/8=1.25 Gb/s. The 10 GbE signal described above is generated by performing 64B66B coding on a signal having the bit rate of 10 Gb/s and the communication bit rate A2 thereof is 10 Gb/s×66/64=10.3125 Gb/s.

Figure 3:
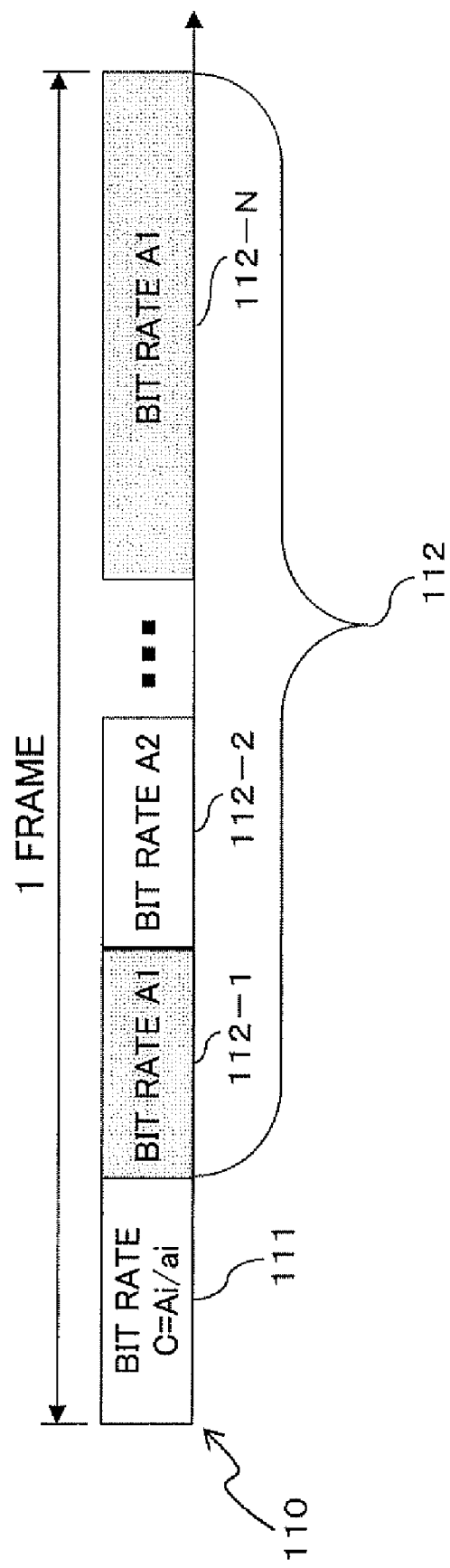
FIG. 3 is a diagram showing a frame format constituting a time division multiplex signal.

FIG. 3 shows a frame format 110 of an optical signal transmitted from the OLT 3 to the ONU 2. The frame format 110 shown in FIG. 3 has a format of a time division multiplex signal composed of a first data area 111 including, for example, frame synchronization information and management information, and a second data area 112 in which, for example, packets 112-1 and 112-3 to 112-N of the 1 GbE signal (bit rate A1) for the low-speed subscribers #1 and #3 to #N and a packet 112-2 of the 10 GbE signal (bit rate A2) for the high-speed subscriber #2 are time division multiplexed.

That is, time slots corresponding to the subscribers #1 to #N are allocated in the second data area 112 constituting a format of an optical signal transmitted from the OLT 3, thereby time division multiplexing the optical packets 112-1 to 112-N addressed to the ONU 2-1 to 2-N corresponding to each subscriber for transmission.

Further, if positive minimal multiples whose multiple operation values on the bit time lengths 1/A1 and 1/A2 for the above communication bit rates A1 and A2 become common are minimal multiples a1 and a2 respectively, a time slot assigned to a time division multiplex optical signal from the OLT 3 for each ONU 2 will be a packet of the number of bits obtained by multiplying the minimal multiples a1 and a2 for the communication bit rates A1 and A2 set for the ONU 2 by any natural number.

Figure 4:
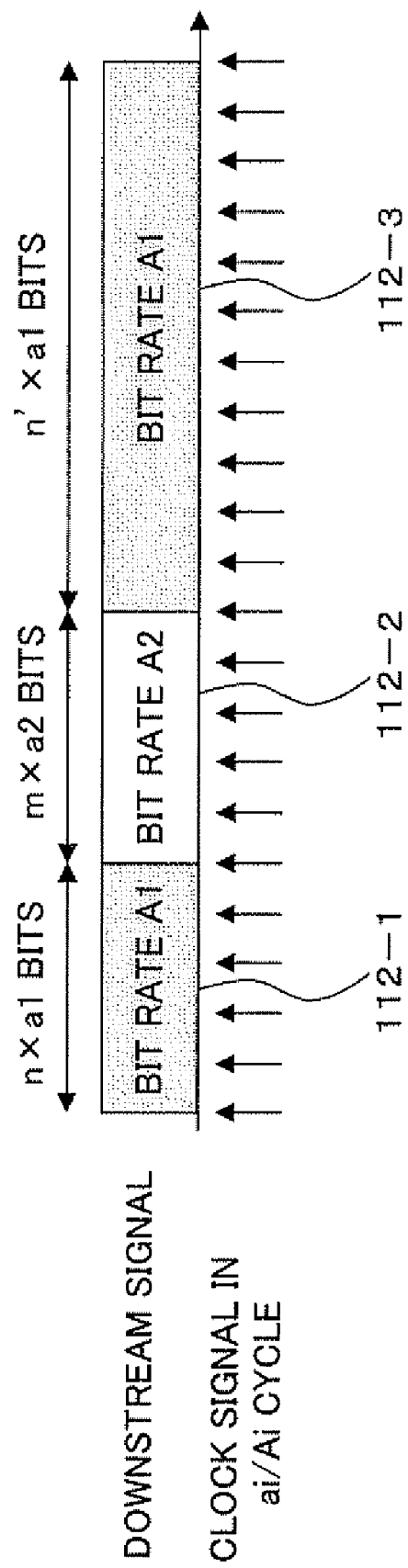
FIG. 4 is a diagram used for describing a packet addressed to each ONU lined up by time division multiplexing.

In other words, the time slot time length allocated to each ONU 2 in the second data area constituting an optical signal frame format transmitted from the OLT 3 corresponds to a packet of the number of bits obtained by multiplying the minimal multiple ai for the communication bit rate Ai set for the ONU 2 by any natural number. For example, as shown in FIG. 4, the packet 112-1 of n×a1 bits (n is an integer) is constituted as a 1 GbE signal addressed to the ONU 2-1, the packet 112-2 of m×a2 bits (m is an integer) as a 10 GbE signal addressed to the ONU 2-2, and the packet 112-3 of n'×a1 bits (n' is an integer) as a 1 GbE signal addressed to the ONU 2-3, and each packet is inserted into the corresponding time slot. Meanwhile, in the present embodiment, A1=1.25 Gb/s and A2=10.3125 Gb/s and thus A2/A1=33/4. Consequently, a1=4 and a2=33.

In this manner, packets composed of 1 GbE signals and those composed of 10 GbE signals can be inserted into time slots while easily synchronizing the packets by using a common clock signal (frequency: A1/a1=A2/a2) in the OLT 3 so that a time division multiplex signal in which two bit rates that are not related to each other as an integral multiple exist can easily be generated.

The frame synchronization information in the first data area has a predetermined frame synchronization pattern and the management information has at least information about locations (time slots) of data signals addressed to each ONU 2 in a downstream frame format and each ONU 2 can perform reception processing of data signals addressed to each local station 2 in a normal receiving timing by establishing frame synchronization and reading the management information after detecting the frame synchronization information. The management information is also used by the OLT 3 to specify a timing (transmit timing) for each ONU 2 to transmit an upstream data signal and if each ONU 2 transmits an upstream data signal to the OLT 3 by following the specified timing, the OLT 3 can perform normal reception processing while avoiding collision of upstream signals from each ONU 2. Though the frame synchronization information and management information are stored in the same time slot in the frame format shown in FIG. 3, each may be stored in different time slots.

The frame synchronization information and management information are written into the first data area described above at a bit rate C=Ai/ai (in this case, A1/a1 or A2/a2) obtained by dividing the communication bit rate Ai by the corresponding minimal multiple ai, thereby constituting a time division multiplex signal in a simple manner in which 1 GbE signals and 10 GbE signals exist on a basis of a common clock (with the frequency Ai/ai, hereinafter referred to as a "common clock C") so that the time division multiplex signal transmitted by the OLT 3 can be received by the ONU 2.

Two different bit rates exist in the first embodiment, but according to the present invention, if three or more different bit rates exist, a time division multiplex signal can also be generated while, like the first embodiment, synchronizing different bits using the common clock C in a simple manner.

The OLT 3 also has a function to perform reception processing of upstream frames from each ONU 2. In the present embodiment, 1 GbE signals are received from the ONU 2-1 and 2-3 to 2-N equipped with a configuration for transmitting and receiving 1 GbE signals and 10 GbE signals are received from the ONU 2-2 equipped with a configuration for transmitting and receiving 10 GbE signals and 10 GbE signals.

Here, the frequency of a reception operation clock for data from the ONU 2-1 and 2-3 to 2-N of the low-speed subscribers #1 and #3 to #N is a clock frequency corresponding to the bit rate A1, which is a1 times [(A1/a1)×a1] the common clock C for transmission described above, and the frequency for data from the ONU 2-2 of the high-speed subscriber #2 is a clock frequency corresponding to the bit rate A2, which is a2 times [(A2/a2)×a2] the common clock C for transmission described above. These clock frequencies can easily be generated from the common clock by frequency dividing or the like.

The branching/multiplexing coupler 12, which is set between the optical fiber 11 and optical fiber 13, functions as a branching means for branching a downstream frame from the OLT 3 to the ONU 2-1 to 2-N (power branching) and also functions as a multiplexing means for multiplexing upstream frames from each ONU 2 for transmission to the OLT 3.

The ONU 2 has functions to detect frame synchronization information included in a downstream frame from the OLT 3 and then, based on the information, reads management information to read (selectively receive) data addressed to each local station 2 and also to transmit data addressed to the OLT 3 in an upstream direction in a timing specified in advance by the OLT 3 in the management information.

Further, based on the above management information written into the first data area, the OLT 3 sequentially assigns the transmit timing of optical signals from the ONU 2 to the OLT 3 at intervals of a time obtained by multiplying a common multiple operation value ai/Ai with respect to a corresponding bit time length 1/Ai by any natural number I as a guard time.

Therefore, the OLT 3 can synchronize the transmit timing of optical signals to the OLT 3 in each ONU 2 with the clock frequency corresponding to a value obtained by dividing the communication bit rate A1 by ai, together with the transmit timing of packets addressed to each ONU 2 in the second data area in the OLT 3.

Figure 5:
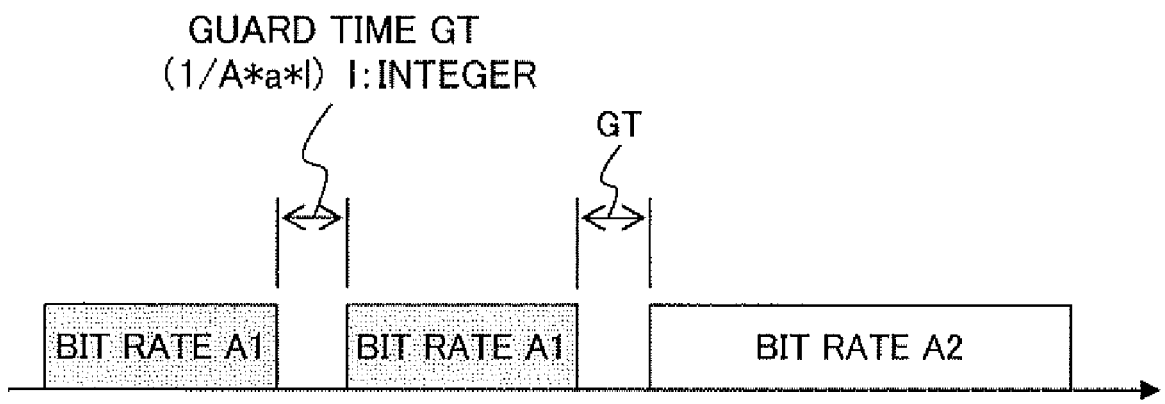
FIG. 5 is a diagram showing each upstream optical signal transmitted sequentially from a plurality of ONUs to the OLT.

Accordingly, while signals are transmitted in turn from the ONU 2 toward the OLT 3 based on instructions from the OLT 3 through the above management information, a time after passage of a guard time, which is a natural number I times ai/Ai, which is a cycle of the common clock, will be set after completion of transmission from a preceding ONU 2 as each transmit timing. Thus, for example, as shown in FIG. 5, a guard time GT, which is I times the ai/Ai, is inserted between upstream optical signals 113-N, 113-1, and 113-2 transmitted sequentially from the ONU 2-N, 2-1, and 2-2 to the OLT 3.

Figure 2:
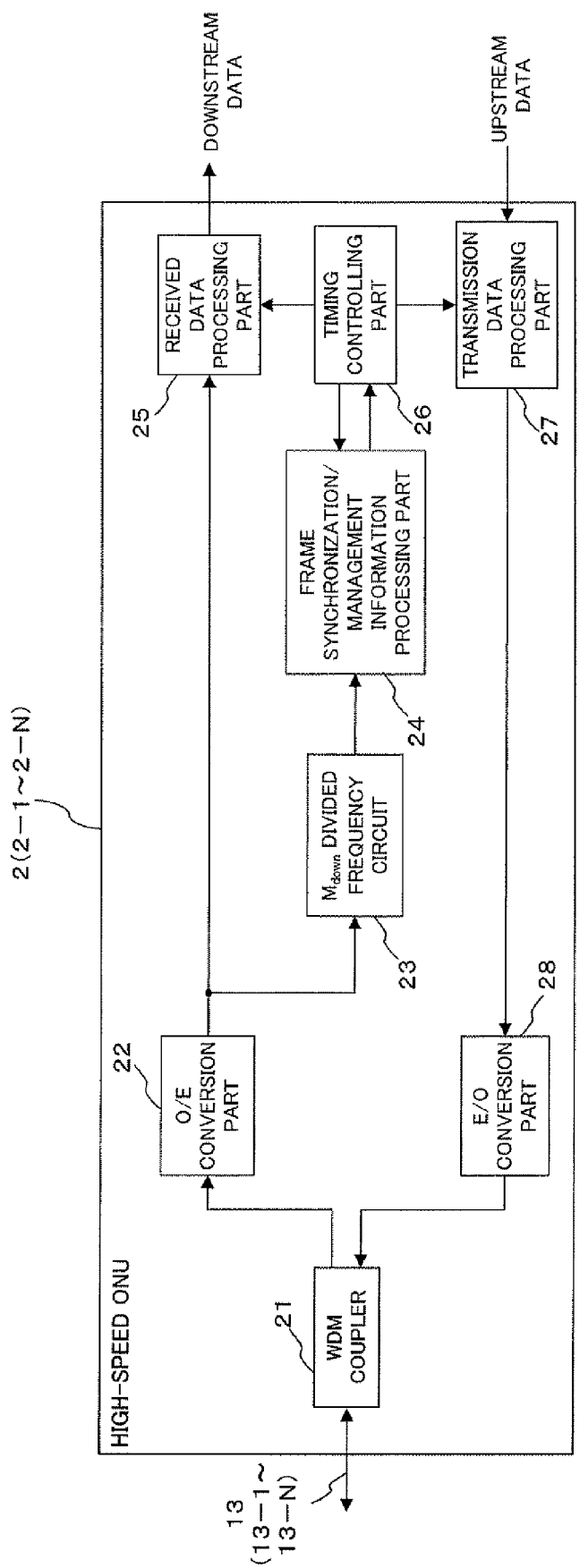
FIG. 2 is a block diagram showing the configuration of principal parts of an optical network unit (ONU) in the first embodiment of the present invention.

To realize the above functions, the OLT 3 has, if focused on principal parts thereof, a configuration, for example, shown in FIG. 1 and each ONU 2 has, if focused on principal parts thereof, a configuration, for example, shown in FIG. 2. Here, the OLT 3 shown in FIG. 1 is comprised of buffers 301 and 302, packetization processing parts 311 and 312, a framing processing part 32, a timing controlling part 33, an electrical/optical (E/O) conversion part 34, a WDM coupler 35, an optical/electrical (O/E) conversion part 36, a selector 37, bit synchronization processing parts 381 and 382, and a data processing part 39.

Here, the buffers 301 and 302 temporarily retain data of the bit rates A1 and A2 input as a signal addressed to one of the ONUs 2 respectively and also outputs the retained signal according to a control signal of output timing from the timing controlling part 33 described later. This makes it possible to specify an order of assignment of each ONU 2 in the second data area when framed as a time division multiplex signal in a subsequent stage.

Data from the buffers 301 and 302 at the bit rates A1 and A2 is input into the packetization processing parts 311 and 312 for packetization in lengths in accordance with time slot lengths in a second data area 112 constituting a time division multiplex signal 110 (See FIG. 3) formed in the framing processing part 32 in a subsequent stage.

For example, as shown in FIG. 4, packets in bit length units of n×a1 and n'×a1 bits are formed in the packetization processing part 311 as the packets 112-1 and 112-3 addressed to the ONU 2-1 and 2-3 respectively and a packet in bit length units of m×a2 bits is formed in the packetization processing part 312 as the packet 112-2 addressed to the ONU 2-2.

The framing processing part 32 is used to frame (time division multiplex) downstream data to be transmitted (or broadcast) to each ONU 2 in the format described in FIG. 3 based on a timing signal synchronized with the common clock from the timing controlling part 33 described later. For example, the framing processing part 32 forms data of the low-speed bit rate A1 addressed to the ONU 2-1 and 2-3 to 2-N from the packetization processing part 311 and data of the high-speed bit rate A2 addressed to the ONU 2-2 from the packetization processing part 312 into the second data area 112 following the format shown in FIG. 3 by time division multiplexing and forms the time division multiplex signal 110 by adding the first data area 111 to the head of the second data area 112.

Meanwhile, the ONU 2 is notified of a data location (time slot) addressed to each ONU 2 in a downstream frame through frame synchronization information written in the first data area 111 inserted by the framing processing part 32 and a data transmit timing (access timing by TDMA) and the like in the upstream direction from the ONU 2 can be reported (specified) to the ONU 2 through management information.

The timing controlling part 33 assigns the transmit timing of packets addressed to each ONU 2 in the second data area 112 (See FIG. 3) by outputting a timing signal synchronized with the common clock C=Ai/ai to the buffers 301 and 302 and the framing processing part 32, and assigns the receiving timing of optical signal from each ONU 2 in synchronization with the above common clock C by outputting the timing signal synchronized with the common clock C to the selector 37, bit synchronization processing parts 381 and 382, and data processing part 39.

Therefore, if positive minimal multiples whose multiple operation values on the bit time lengths 1/Ai for a plurality of communication bit rates Ai become common are minimal multiples ai respectively, the buffers 301 and 302 having a sequence in accordance with the above bit rate Ai, the packetization processing parts 311 and 312, the framing processing part 32, and the timing controlling part 33 constitute a multiple signal constituting part constituting a time division multiplex optical signal composed of the first data area having the bit rate Ai/ai and including frame synchronization information and the second data area in which packets addressed to each ONU 2 at the communication bit rate Ai are time division multiplexed.

The E/O conversion part 34 is used to E/O-convert a downstream frame generated by the framing processing part 32 from an electric signal to an optical signal (for example, 1.49 μm band light). That is, the E/O conversion part 34 converts a digital electric signal from the framing processing part 32, for example, to an optical signal (whose wavelength is in the 1.49 μm band) whose light intensity is modulated and then outputs the optical signal.

The WDM coupler 35 is used to transmit a downstream frame E/O-converted by the E/O conversion part 34 to the optical fiber 11 and also to output an upstream frame (for example, 1.31 μm band light) from the optical fiber 11 to the O/E conversion part 36.

Therefore, the above E/O conversion part 34 and WDM coupler 35 constitute a transmission part that transmits a time division multiplex optical signal formed by the framing processing part 32 as the multiple signal constituting part to a plurality of ONU 2 through the branching/multiplexing coupler 12.

The O/E conversion part 36 is used to O/E-convert an upstream frame demultiplexed by the WDM coupler 35 from an optical signal to an electric signal. If, for example, an optical signal (whose wavelength is in the 1.31 μm band) from the WDM coupler 35 is an optical signal, which is transmission data from the ONU 2, whose light intensity is modulated, the optical signal is converted to an analog electric signal having amplitude changes corresponding to light intensity thereof before outputting the electric signal to the selector 37 in a subsequent stage.

The selector 37 is used to selectively output an electric signal from the O/E conversion part 36 to the bit synchronization processing part 381 or 382 based on a switching signal synchronized with the common clock C from the timing controlling part 33. More specifically, an electric signal from the O/E conversion part 36 is output to the bit synchronization processing part 381 in a receiving timing of a optical signal from the ONU 2-1 and 2-3 to 2-N corresponding to low-speed subscribers and an electric signal from the O/E conversion part 36 is output to the bit synchronization processing part 382 in the receiving timing of an optical signal from the ONU 2-2 corresponding to a high-speed subscriber.

The bit synchronization processing part 381 performs reception processing of an upstream frame from the ONU 2 at a clock frequency (hereinafter referred to as a clock A1) corresponding to the low-speed bit rate A1 and is used to bit-synchronize the receiving timing of data included in the upstream frame and a reception processing operation clock of the OLT 3. The bit synchronization processing part 382 performs reception processing of an upstream frame from the ONU 2 at a clock frequency (hereinafter referred to as a clock A2) corresponding to the high-speed bit rate A2 and is used to bit-synchronize the receiving timing of data included in the upstream frame and the reception processing operation clock of the OLT 3.

That is, the bit synchronization processing part 381 extracts a clock component corresponding to the low-speed bit rate A1 of electric signals input in a sequence set via the selector 37 from the ONU 2-1 and 2-3 to 2-N after a timing signal linked to a switching signal from the selector 37 is input, and also identifies symbols "0" and "1" in synchronization with the extracted clock and sequentially outputs the electric signals to the data processing part 39 in a subsequent stage in synchronization with the common clock C, which is the reception operation clock of the OLT 3.

The bit synchronization processing part 382 also extracts a clock component corresponding to the high-speed bit rate A2 of electric signals input in a timing set via the selector 37 from the ONU 2-2 after a timing signal linked to a switching signal from the selector 37 is input, and also identifies symbols "0" and "1" in synchronization with the extracted clock and outputs the electric signals to the data processing part 39 in the subsequent stage in synchronization with the common clock C, which is the reception operation clock of the OLT 3.

The data processing part 39 is used to perform received signal processing of signals for which synchronization processing has been performed by the bit synchronization processing part 381 or 382, and based on a timing signal input from the timing controlling part 33, an operation mode is switched so that received signal processing is performed at the bit rate A1 in a timing when a signal is input from the bit synchronization processing part 381 and received signal processing is performed at the bit rate A2 in a timing when a signal is input from the bit synchronization processing part 382.

By configuring the OLT 3 as described above, in the frame format shown in FIG. 4, data addressed to the low-speed ONU 2-1 and 2-3 to 2-N can be transmitted at the bit rate A1 while transmitting data addressed to the high-speed ONU 2-2 at the bit rate A2, and frame synchronization information and management information can be transmitted at the bit rate Ai/ai obtained by these bit rates A1 and A2 by an integer (divided by a1 or a2).

Further, upstream frames from each ONU 2 in which data of the bit rate A1 and data of the bit rate A2 exist can be caused to be bit-synchronized in the bit synchronization processing parts 381 and 382 respectively by a timing signal based on the common clock C so that received signal processing of data of the bit rates A1 and A2 can be performed by the data processing part 39 whose operation mode is switched by the timing controlling part 33.

Next, the ONU 2 shown in FIG. 2 is comprised of, for example, a WDM coupler 21, an O/E conversion part 22, an M down frequency dividing circuit 23, a frame synchronization/management information processing part 24, a received data processing part 25, a timing controlling part 26, a transmission data processing part 27, and an E/O conversion part 28, and operates (performs reception processing) using the clock Ai corresponding to the communication bit rate Ai set for each ONU 2 as a basic operation clock.

Here, in the ONU 2 shown in FIG. 2, the WDM coupler 21 is used to output a downstream frame (1.49 μm band light) from the optical fiber 13 to the O/E conversion part 22 and also to transmit data (1.31 μm band light) in the upstream direction from the E/O conversion part 28 to the optical fiber 13.

The O/E conversion part 22 is used to O/E-convert a downstream frame (time division multiplex signal 110; see FIG. 3) demultiplexed by the WDM coupler 21 from an optical signal to an electric signal. More specifically, if transmission data from the OLT 3 whose light intensity is modulated is input as an optical signal (1.49 μm band light) from the WDM coupler 21, the optical signal is converted to an analog electric signal having amplitude changes corresponding to light intensity thereof and then, in synchronization with the above basic operation clock Ai from a clock supply source (not shown), symbols "0" and "1" in the converted analog electric signal are identified and a digital electric signal is output as an identification result.

The Mdown frequency dividing circuit 23 is used to Mdown (which may hereinafter be described simply as M in the first embodiment)—divide a first portion of a digital electric signal branched into two portions from the O/E conversion part 22 as pre-processing for reading content from the first data area 111 constituting the time division multiplex signal 110 by the frame synchronization/management information processing part 24 in a subsequent stage. Mdown, which is a frequency dividing number in the Mdown frequency dividing circuit 23, is set to a value in accordance with the frequency of the basic operation clock Ai in the ONU 2.

More specifically, the basic operation clock for the Mdown frequency dividing circuit 23 in the low-speed ONU 2-1 and 2-3 to 2-N is A1 and an input digital electric signal is divided by M a1 to read content in the first data area 111 at the bit rate A1/a1 in the Mdown frequency dividing circuit 23 for the ONU 2-1 and 2-3 to 2-N. In the high-speed ONU 2-2, on the other hand, the basic operation clock is A2 and an input digital electric signal is divided by M=a2 to read content in the first data area 111 at the bit rate A1/a2 in the Mdown frequency dividing circuit 23 for the ONU 2-2.

In this case, as described above, the bit rate corresponding to the basic operation clock A1 in the ONU 2-1 and 2-3 to 2-N is A1=1.25 Gb/s and the frequency dividing number in the Mdown frequency dividing circuit 23 is M=a1=4. The bit rate corresponding to the basic operation clock A2 in the ONU 2-2 is A2=10.3125 Gb/s and the frequency dividing number in the Mdown frequency dividing circuit 23 is M=a1=33.

Figure 6:
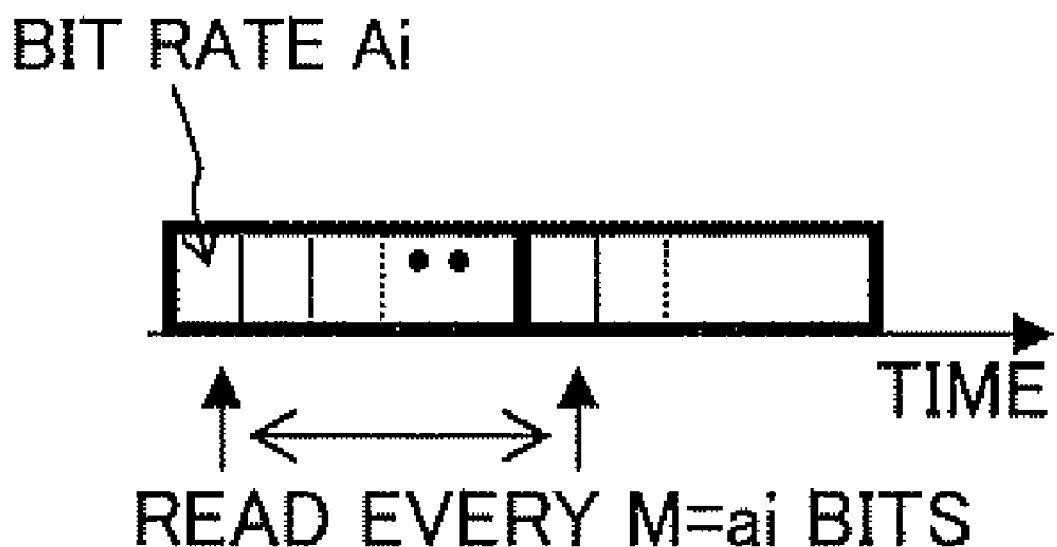
FIG. 6 is a diagram used for describing an operation of the ONU in the first embodiment of the present invention.

In other words, as shown in FIG. 6, a digital electric signal at the bit rate Ai corresponding to the basic operation clock Ai from the O/E conversion part 22 is delivered from the Mdown frequency dividing circuit 23 to the frame synchronization/management information processing part 24 by reading data in ai bits. Meanwhile, according to the present invention, a configuration for reading data in ai bits, as described above, is not limited to the frequency dividing circuit and may be realized by other configurations.

The frame synchronization/management information processing part 24 is used to detect frame synchronization information and management information included in the first data area 111 of a downstream frame. That is, with cooperation between the Mdown frequency dividing circuit 23 and frame synchronization/management information processing part 24, reception processing of downstream frames from the O/E conversion part 22 is performed in an M-bit cycle and also frame synchronization information and management information included in the first data area 111 of the time division multiplex signal 110 are detected.

Therefore, the Mdown frequency dividing circuit 23 and frame synchronization/management information processing part 24 constitute a synchronization information detecting part that performs reception processing of content in the first data area 111 of the time division multiplex signal 110 (See FIG. 3) input from the OLT 3 via the branching/multiplexing coupler 12 in the ai-bit cycle corresponding to the bit rate Ai set for the ONU 2 and detects frame synchronization information in the first data area 111.

Then, the timing controlling part 26 is used to control a reception processing timing by the received data processing part 25 described later based on data locations in frames addressed to the local station 2 obtained from the frame synchronization information and management information detected by the frame synchronization/management information processing part 24 and also to control a transmission processing timing by the transmission data processing part 27 based on a transmit timing obtained from the management information when transmitting data to the OLT 3.

The received data processing part 25 is used to perform received data processing of the time division multiplex signal 110 as a second portion of the digital electric signal branched into two portions from the O/E conversion part 22 according to the timing control from the timing controlling part 26. That is, the received data processing part 25 performs, after a digital electric signal of the time division multiplex signal 110 being input, reception processing of data inserted into a time slot assigned to the local station 2 in the second data area 112 in the time division multiplex signal 110.

The transmission data processing part 27 is used to perform transmission processing of data to the OLT 3, that is, output processing to the E/O conversion part 28 according to the timing control from the timing controlling part 26. The timing controlling part 26 controls the transmission data processing part 27 so that, as described above, reception processing of input digital electric signals is performed in a timing based on instructions of a transmit timing from the OLT 3 written in the first data area 111. This enables each ONU 2 to transmit data to the OLT 3 by providing a guard time GT according to instructions from the OLT 3, as shown in FIG. 5, so that mutual transmit timings do not overlap.

Since data whose reception processing is performed by the received data processing part 25 is data addressed to the local station 2, the received data processing part 25 can perform received data processing using the bit rate Ai held by a digital electric signal (synchronized with the basic operation clock Ai) from the O/E conversion part 22. Data transmitted from the transmission data processing part 27 can also be output to the E/O conversion part 28 as a signal of the bit rate Ai (synchronized with the basic operation clock Ai).

Then, the E/O conversion part 28 is used to E/O-convert data in the upstream direction from the transmission data processing part 27 from an electric signal to an optical signal. That is, a digital electric signal from the transmission data processing part 27 is converted by the E/O conversion part 28, for example, to an optical signal (whose wavelength is in the 1.31 μm band) whose light intensity is modulated for output.

With the configuration described above, each ONU 2 performs demultiplexing of the time division multiplex signal 110 as a downstream frame transmitted from the OLT 3 via the optical fiber 13 in the WON coupler 21 and o/E conversion in the O/E conversion part 22 before outputting as a digital electric signal of the bit rate Ai corresponding to the basic operation clock of each ONU 2.

Then, the time division multiplex signal 110 as a digital electric signal of the bit rate Ai corresponding to the basic operation clock of each ONU 2 is M (=ai)—divided by the Mdown frequency dividing circuit 23. In this case, the Mdown frequency dividing circuit 23 in the ONU 2-1 and 2-3 to 2-N performs M=a1=4 frequency division and the Mdown frequency dividing circuit 23 in the ONU 2-2 performs M=a2=33 frequency division before outputting the signal to the frame synchronization/management information processing part 24.

The frame synchronization/management information processing part 24 detects frame synchronization information and management information written in the first data area 111 from a signal divided by the above Mdown frequency dividing circuit 23.

Further, the timing controlling part 26 receives instructions necessary for timing control of the received data processing part 25 and transmission data processing part 27 in the local stations 2 from the detected frame synchronization information and management information. Then, by performing the timing control of the received data processing part 25 in accordance with received instruction content, reception processing of data signals addressed to the local station 2 is performed in a normal receiving timing to extract downstream data.

Upstream data from a user of each ONU 2, on the other hand, is transmitted to the OLT 3 in a normal transmit timing while the timing controlling part 26 performs the timing control of the transmission data processing part 27 according to the management information detected by the frame synchronization/management information processing part 24 from the downstream frame. The upstream data is E/O-converted by the E/O conversion part 28 to be output to the optical fiber 13 by the WDM coupler 21 for transmission to the OLT 3 via the branching/multiplexing coupler 12 and optical fiber 11.

By configuring the ONU 2 as described above, reception processing of only data addressed to the local station 2 can correctly (normally) be performed at the bit rate set for the local station 2 without performing reception processing of data of the bit rate set for other ONUs than the local station 2 in a downstream frame transmitted from the OLT 3. For example, the ONU 2-1 and 2-3 to 2-N perform reception processing of data addressed to the ONU 2-1 and 2-3 to 2-N at the bit rate A1 set for each, whereas no configuration is needed for performing reception processing of data of the bit rate A2.

Reception processing is normally performed in a normal timing according to frame synchronization information to receive only data signals addressed to the local stations 2, but if the frame synchronization information cannot be detected for some reason, the ONU 2-1 and 2-3 to 2-N operating at the basic clock A1 can catch data of the bit rate A2 only as noise.

Therefore, the ONU 2-1 and 2-3 to 2-N for the bit rate A1 can still receive data of the bit rate A1 correctly (normally) even if data of the bit rate A1 and data of the bit rate A2 exist in a downstream frame without modifying specifications (upgrading or equipment renewal) at all.

Also for the OLT 3, an optical communication system accommodating ONU 2 of different bit rates Ai can be constructed with a simpler system configuration than conventional techniques because a downstream frame can be formed and transmitted and also an optical signal from each ONU 2 as an upstream frame can be received based on the common clock C=Ai/ai even if ONU 2 for which different bit rates Ai are set are accommodated.

According to the first embodiment, as described above, the OLT 3 transmits the time division multiplex signal 110 (See FIG. 3) to which a plurality of time slots are assigned corresponding to each ONU 2 to the ONU 2 via the branching/multiplexing coupler 12 and optical fibers 11 and 13, each of the ONU 2 transmits an optical signal of the set bit rate Ai in a transmit timing assigned by the OLT 3 to the OLT 3 via the branching/multiplexing coupler 12 and optical fibers 11 and 13, and if positive minimal multiples whose multiple operation values on the bit time lengths 1/Ai for a plurality of communication bit rates Ai become common are minimal multiples ai respectively, a time slot for each ONU 2 assigned to the time division multiplex signal 110 by the OLT 3 and an optical signal transmitted from each ONU 2 can both be made a packet of the number of bits obtained by multiplying the minimal multiple ai for the communication bit rate Ai set for the ONU 2 by any natural number n, m, and n', and so, if the ONU 2-1 and 2-3 to 2-N for which the single bit rate is first set are accommodated and then the ONU 2-2 for which the bit rate A2 that is not related to A1 as an integral multiple and is different from A1 is added, or the existing ONU 2-2 is adapted to receive at the bit rate A2, particularly a transmit timing of signal from the ONU 2 in the upstream transmission direction and a receiving timing in the OLT 3 can easily be matched while minimizing special specification changes of the relevant ONU 2-2 and the ONU 2-1 and 2-3 to 2-N whose bit rate is not changed, making system construction easier.

If the bit rate A1 is first set for the accommodated ONU 2-1 to 2-N and then the ONU 2-2 should be upgraded so that the ONU 2-2 is set to receive the bit rate A2, like the present embodiment, communication in which optical signals of the bit rate A1 and those of the bit rate A2 exist in the time division multiplex signal 110 (See FIG. 3) can easily be realized by upgrading only the ONU 2-2 that needs services of the bit rate A2 while leaving the ONU 2-1 and 2-3 to 2-N for which optical signals (services) of the bit rate A1 are sufficient (in other words, data of the bit rate A2 is not needed) as they are (without upgrading) and thus, specification changes of an entire system are not needed and also upgrade costs of the ONU 2 and manpower required for the upgrading can significantly be reduced.

Since the upgraded ONU 2-2 can normally detect management information and bit synchronization information in the first data area 111 (See FIG. 3) only by changing the frequency dividing number and the basic operation clock C corresponding to the bit rate Ai, compatibility with existing systems can also be ensured. Further, since M can be selected as an integer for the Mdown frequency dividing circuit 23, the Mdown frequency dividing circuit 23 (frame synchronization processing part) can be realized as a simple circuit configuration, contributing to a reduced size of a circuit structure and reduced costs.

Further, since the OLT 3 can perform reception processing of optical signals from the WDM coupler 35 by timing control performed by the timing controlling part 33 at a clock frequency corresponding to the bit rate Ai in accordance with optical signals from each ONU 2 to establish bit synchronization and perform reception processing of the optical signals of the bit rate Ai at the corresponding bit rate, synchronization establishment by optical signal of each bit rate can be realized with a simple structure to correctly perform reception processing of optical signals of the bit rate Ai from each ONU 2.

[B] Description of the Second Embodiment

Figure 7:
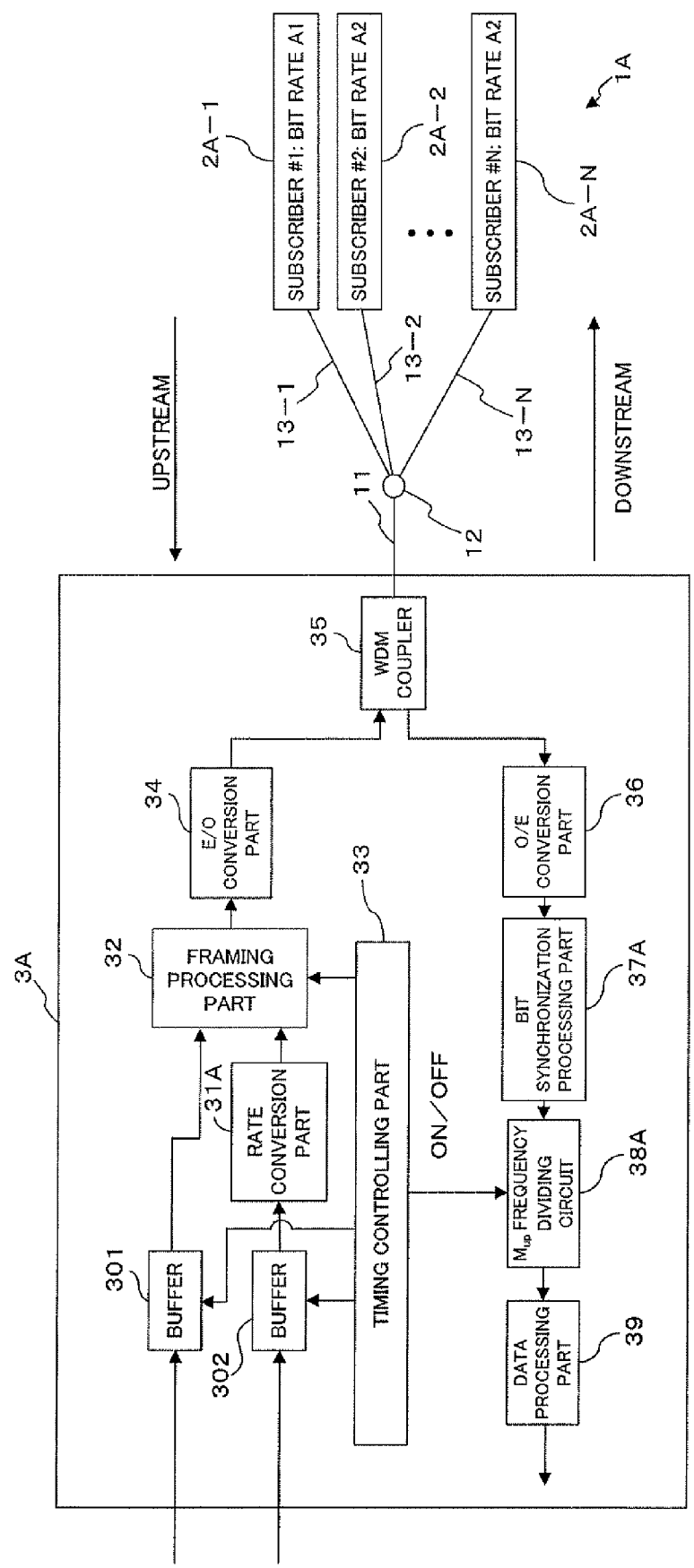
FIG. 7 is a block diagram showing a PON system in a second embodiment of the present invention together with the configuration of principal parts of an optical line terminal (OLT)

FIG. 7 is a block diagram showing the configuration of principal parts of a PON system (multiple bit rate optical communication system) according to the second embodiment of the present invention. Like the PON system 1 in the first embodiment described above, a PON system 1A shown in FIG. 7 is comprised of an OLT 3A, ONU 2A-1 to 2A-N (denoted simply as an ONU 2A if not to be distinguished), the branching/multiplexing coupler 12, and the optical fibers 11 and 13.

Here, in the PON system 1A according to the second embodiment, if k [k is an integer equal to or greater than 2; k=2 in the present embodiment] different communication bit rates Ai [i=1, . . . , k], which are not related to each other as multiples of natural numbers, set for the ONU 2A exist, transmission through the optical fibers 11 and 13 and the branching/multiplexing coupler 12 is performed by performing a rate conversion of signals handled by the ONU 2A to which at least one bit rate Aj [j≠i] belonging to these bit rates Ai of the input signals is set from the bit rate Aj to the bit rate Atj so that the bit rates A1 [i≠j] and Atj of signals transmitted to a plurality of ONU 2A are related to each other as multiples of natural numbers.

Assume, as a concrete example, that the PON system 1A according to the second embodiment accommodates the ONU 2A in which 1 GbE and 10 GbE exist and are applied for which, as a plurality of bit rates that are different and unrelated to each other as multiples of natural numbers, two bit rates of A1=1.25 Gb/s and A2=10.3125 Gb/s are set like the first embodiment described above.

In this case, as pre-processing for transmission of data of the bit rate A2 of the two bit rates A1 and A2 through the optical fibers 11 and 13, which are upstream/downstream transmission lines, and the branching/multiplexing coupler 12, the rate conversion of the bit rate A2=10.3125 Gb/s to the bit rate At2 of 10 Gb/s is performed so that these bit rates A1 and At2 are related to each other as multiples of natural numbers (At2=8×A1).

Figure 8:
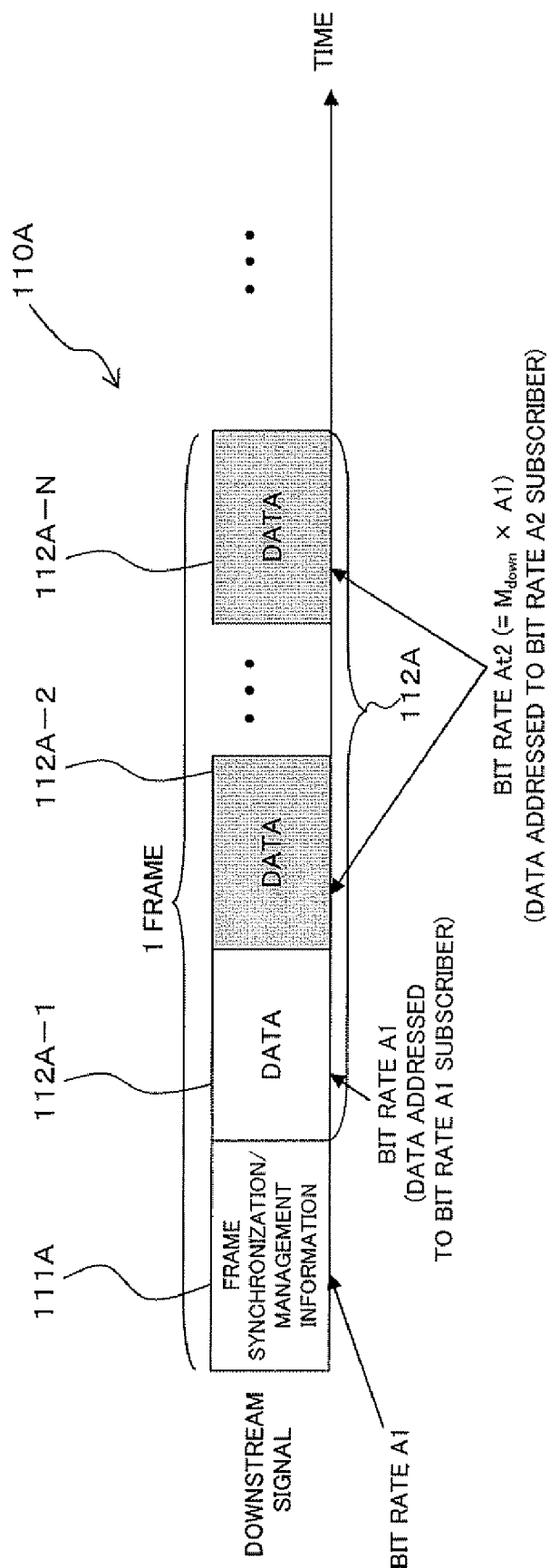
FIG. 8 is a diagram showing a frame format constituting a time division multiplex signal.

FIG. 8 shows a frame format when transmitting an optical signal (downstream frame) including data of a plurality of bit rates Ai [i≠j] and Atj, which are now related to each other as multiples of natural numbers described above, from the OLT 3A to the ONU 2A. A time division multiplex signal in the frame format shown in FIG. 8 is formed and transmitted from the OLT 3A to each ONU 2A.

Here, the time division multiplex signal shown in FIG. 8 has a frame configuration composed of a first data area 111A including, like the first embodiment, frame synchronization information and management information and following the first data area 111A, a second data area 112A in which packets addressed to each ONU of the bit rates Ai [i≠j] and Atj that are now related to each other as multiples of natural numbers. Then, content in the above first data area 111A is written at a bit rate corresponding to a common divisor of the bit rates Ai [i≠j] and Atj related to each other as multiples of natural numbers.

In FIG. 8, no rate conversion of the bit rate of a packet addressed to the ONU 2A-1 in the second data area 112A is performed to retain the low-speed bit rate A1, while the rate conversion of the bit rate of other packets addressed to the ONU 2A-2 to 2A-N is performed to a high-speed bit rate At2. Then, data is written at the bit rate of 1.25 Gb/s, which is the greatest common divisor of A1=1.25 Gb/s and A2=10 Gb/s, in the first data area 111A.

Accordingly, frame synchronization information and management information included in a downstream frame from the OLT 3A is detected in the ONU 2A at the bit rate A1 and data addressed to a local station 2A is read (received selectively) in a receiving timing based on the detected frame synchronization information.

At this point, in the ONU 2-1 for which the communication bit rate A1 is set, data addressed to the local station 2A can be read by using a clock signal (1.25 Gb/s) having the same frequency as a clock signal for detecting information in the first data area 111A, while in the ONU 2A-2 to 2A-N for which the communication bit rate A2 is set, data addressed to the local station 2 at the bit rate At2 to which the rate has been converted. Since the clock A1 at which the above first data area 111A is read corresponds to a bit rate obtained by dividing the bit rate At2 for reading data by a natural number (8), the configuration for receiving optical signals by each ONU 2A is made simpler. Meanwhile, a rate reconversion of signals to their original bit rate A2 is performed as needed in the ONU 2A-2 to 2A-N that have received signals of the bit rate At2.

The ONU 2A transmits upstream optical signals toward the OLT 3A and has a function, based on management information detected in the first data area 111A included in the downstream frame described above from the OLT 3A, to transmit data addressed to the OLT 3A in the upstream direction according to a timing specified in the management information by the OLT 3A in advance. Meanwhile, as pre-processing for transmitting an optical signal toward the OLT 3A, a rate conversion of the bit rate of data to be transmitted from A2 to At2 is also performed in the ONU 2A-2 to 2A-N for which the bit rate A2 is set.

Further, the OLT 3A also has a function to perform reception processing of upstream frames from each ONU 2A and the reception operation clock thereof is a clock frequency corresponding to the bit rate At2 (=8×A1) of data in the upstream direction from the ONU 2A-2 to 2A-N of high-speed subscribers #2-#N. Meanwhile, a rate reconversion of received signals of the bit rate At2 is performed as needed to their original bit rate A2.

Here, to realize the above functions, the OLT 3R is, basically like the first embodiment described above, comprised of, if focused on principal parts thereof, the buffers 301 and 302, framing processing part 32, timing controlling part 33, E/O conversion part 34, WDM coupler 35, O/E conversion part 36, and data processing part 39, as shown in, for example, in FIG. 7, and also a rate conversion part 31A, a bit synchronization processing part 37A, and an Mup frequency dividing circuit 38A, which are not included in the first embodiment as components. The same numerals in FIG. 7 as those in FIG. 1 denote nearly the same components.

That is, the buffers 301 and 302 temporarily retain data of the bit rates A1 and A2 input as a signal addressed to one of the ONUs 2 respectively and also outputs the retained signal according to a control signal of output timing from the timing controlling part 33 described later. This makes it possible to specify the order of assignment of each ONU 2 and the interval in the second data area 112A when framed as a time division multiplex signal in a subsequent stage.

Here, the rate conversion part 31A performs a rate conversion of data of the bit rate A2 output from the buffer 302 to data of the bit rate At2 described above and outputs the data to the framing processing part 32. This enables the framing processing part 32 to form signals of the bit rate A2 into the time division multiplex signal 110 (See FIG. 8) after being converted to signals of the bit rate At2.

Figure 9:
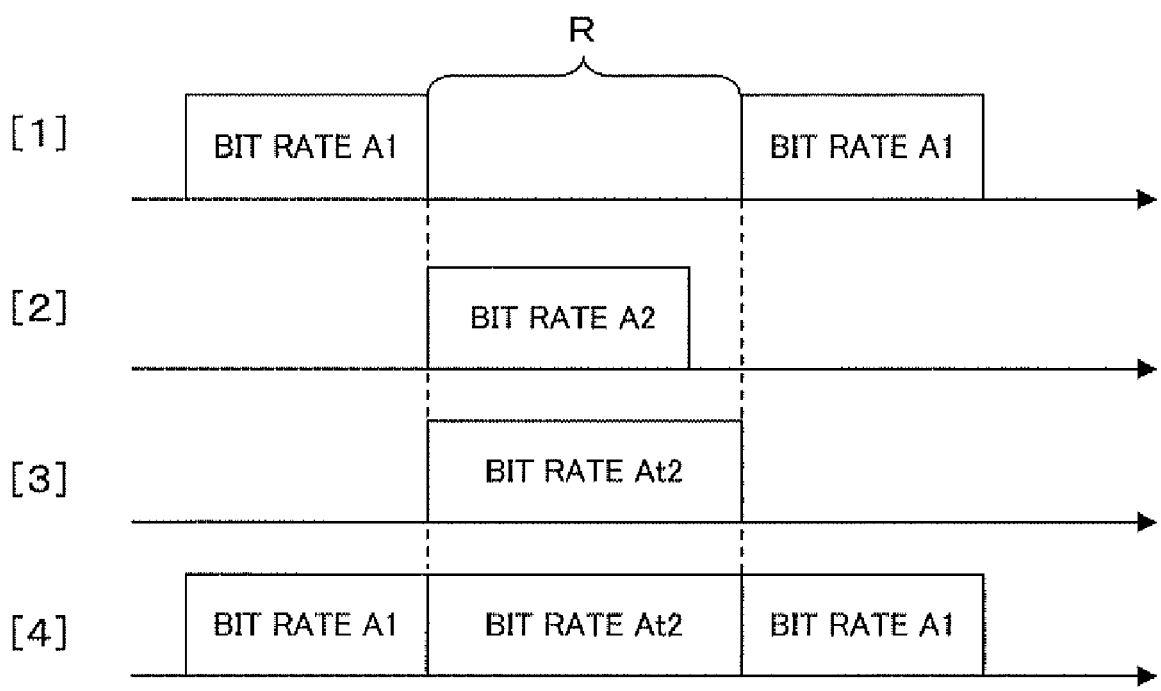
FIG. 9 is a diagram used for describing an operation of a rate conversion part in the second embodiment of the present invention.

More specifically, a rate conversion of a signal of the bit rate A2 (See [2] in FIG. 9) output from the buffer 302 is performed by the rate conversion part 31A before being input into the framing processing part 32 (See [3] in FIG. 9). Then, assuming two signals of the bit rate A1 from the buffer 301 output in a timing before and after the signal of the bit rate A2 output from the buffer 302 (See [1] in FIG. 9), an output interval R of the two signals of the bit rate A1 can be made to incorporate an extended time length after the rate conversion of signal of the bit rate A2 when constituting a time division multiplex signal in the framing processing part 32 in a subsequent stage (See [4] in FIG. 9).

Therefore, the buffers 301 and 302 and the rate conversion part 31A described above constitute a rate conversion part into which signals having the bit rate A1 addressed to a plurality of ONU 2A are input and, by performing a rate conversion of signals addressed to the ONU 2 to which at least one bit rate Aj [j∈i] belonging to the bit rates A1 of the input signals is set to the bit rate Atj, the bit rates Ai [i≠j] and Atj of signals transmitted to the plurality of ONU 2A are related to each other as multiples of natural numbers.

Here, the framing processing part 32 is used, like in the first embodiment described above, to frame (time division multiplex) downstream data to be transmitted (broadcast) to each ONU 2A in the format described above in FIG. 8. That is, the framing processing part 32 functions as a multiple signal constituting part for constituting a time division multiplex signal composed of the first data area 111A including frame synchronization information and the second data area 112A in which packets addressed to each ONU 2A of the bit rates A1 and A2, which are now related to each other as a multiple of a natural number ("8" in the second embodiment) by a rate conversion by the rate conversion part 31A, are time division multiplexed.

The bit synchronization processing part 37A is used to perform reception processing of upstream frames from the ONU 2A at a clock frequency (hereinafter referred to as a clock At2) corresponding to the high-speed bit rate At2 to bit synchronize a receiving timing of data included in an upstream frame and the reception processing operation clock of the OLT 3A. More specifically, symbols "0" and "1" in an electric signal input from the O/E conversion part 36 are identified in synchronization with the reception operation clock corresponding to the high-speed bit rate At2 and the electric signal is output to the Mup frequency dividing circuit 38A as a digital electric signal.

The Mup frequency dividing circuit 38A is used, under timing control, more specifically ON/OFF control from the timing controlling part 33, to Mup (=M)-divide the reception processing operation clock of the OLT 3A. For example, the reception operation clock (clock At2) of the OLT 3 is Mup (=8)—divided when the timing controlling part 33 turns on the Mup frequency dividing circuit 38A upon arrival of data of the bit rate A1 (=At2/8).

This enables the data processing part 39 described later to perform data processing of data of substantially the bit rate A1 (=At2/8) by causing the data processing part 39 to perform reception processing of digital electric signals of the bit rate At2 in an Mup-bit cycle (once in Mup clocks) of the clock At2.

Here, since the bit rate At2 is Mup times the bit rate A1, the clock At2 also becomes Mup times the clock frequency (hereinafter referred to as a clock A1) corresponding to the bit rate A1. That is, by on-control of the Mup frequency dividing circuit 38A, the data processing part 39 will operate at the clock A1 obtained by Mup-dividing the clock At2 for data of the bit rate A1.

In a receiving timing of data of the bit rate At2, on the other hand, the timing controlling part 33 turns off the operation of the Mup frequency dividing circuit 38A and thus, the data processing part 39 can correctly receive data of the bit rate At2 in bits (that is, at the clock At2) as it is. Meanwhile, since a transmit timing (access timing) of upstream data from each ONU 2A is managed by the OLT 3A, the OLT 3A grasps a data receiving timing of the bit rates A1 and At2 without detection or establishment processing of upstream frame synchronization. Also, since the Mup is a natural number, the Mup frequency dividing circuit 38A can be realized as a simple circuit configuration, contributing to a reduced size of a circuit structure and reduced costs.

The data processing part 39 is used, as described above, to perform data processing of data of the bit rate A1 at the clock A1 or data of the bit rate At2 at the clock At2 depending on an ON/OFF state of the Mup frequency dividing circuit 38A. Meanwhile, data processing of data of the bit rate At2 described above may be performed as needed after a reconversion to the bit rate A2.

By configuring the OLT 3A as described above, data addressed to the low-speed ONU 2A-1 (See numeral 112A-1 in FIG. 8) in the frame format shown in FIG. 8 can be transmitted at the bit rate A1, while transmitting data addressed to the high-speed ONU 2A-2 to 2A-N (See numerals 112A-2 to 112A-N in FIG. 8) at the bit rate At2 converted from the bit rate A2.

Further, for an upstream frame from each ONU 2A in which data of the bit rate A1 and data of the bit rate A2 exist, bit synchronization is established by the common reception operation clock At2 in the common bit synchronization processing part 37A and, at the same time, received data processing of both low-speed data of the bit rate A1 at the clock A1 obtained by Mup-dividing the clock At2 (Mup-bit cycle of the bit rate At2) and high-speed data of the bit rate At2 in a bit cycle using the clock At2 as it is can be performed in the data processing part 39 by the ON/OFF control of the Mup frequency dividing circuit 38 performed by the timing controlling part 33. If the 10 GbE interface should be connected for the received data processing, a rate reconversion to the original bit rate A2=10.3125 Gb/s is performed.

Figure 10:
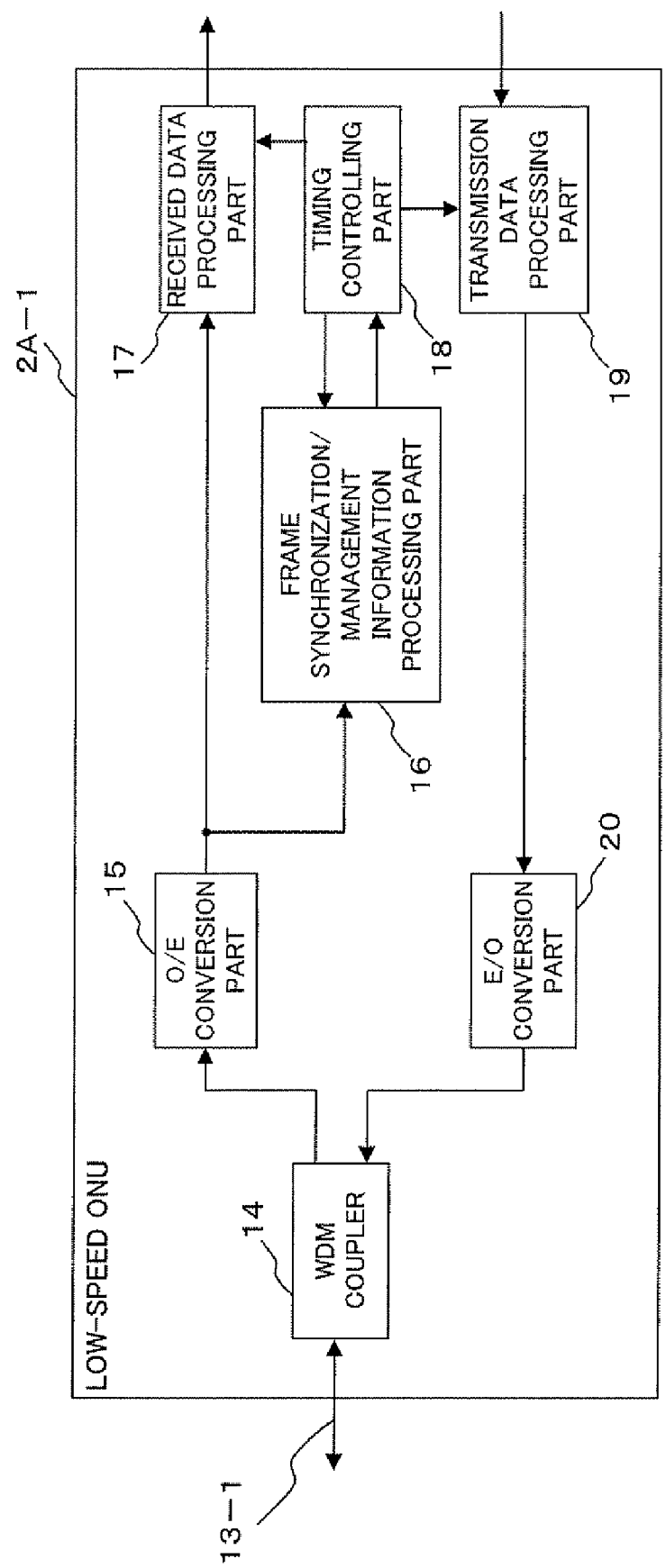
FIGS. 10 and 11 are block diagrams showing the configuration of principal parts of optical network units (ONUs) in the second embodiment of the present invention.

Next, the ONU 2A will be described with reference to FIGS. 10 and 11. FIG. 10 is a block diagram showing the configuration of principal parts of the ONU 2A-1 for the low-speed subscriber #1 and FIG. 11 is a block diagram showing the configuration of principal parts of the ONU 2A-2 to 2A-N for the high-speed subscribers #2 to #N.

First, as shown in FIG. 10, the ONU 2A-1 for the low-speed subscriber #1 (hereinafter also referred to as a low-speed or existing ONU) is comprised of, for example, a WDM coupler 14, an O/E conversion part 15, a frame synchronization/management information processing part 16, a received data processing part 17, a timing controlling part 18, a transmission data processing part 19, and an E/O conversion part 20, and operates (performs reception processing) using the clock A1 as a basic operation clock.

Figure 11:
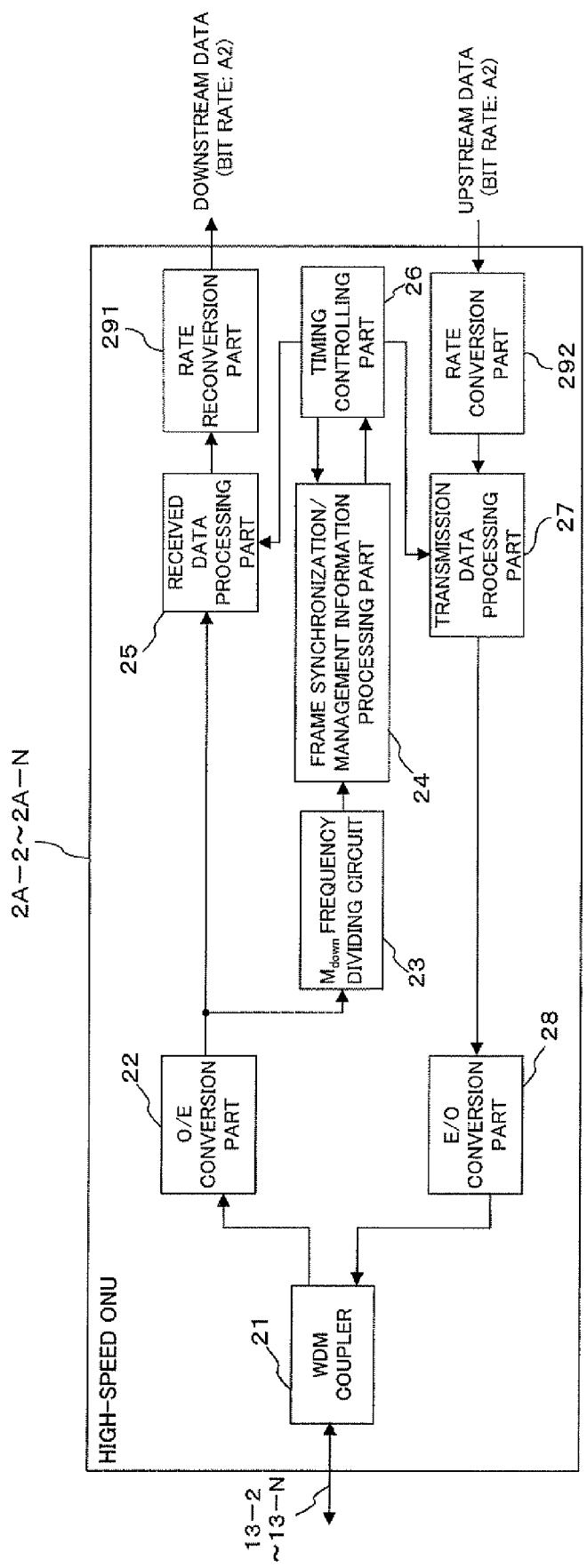
Figure 12:
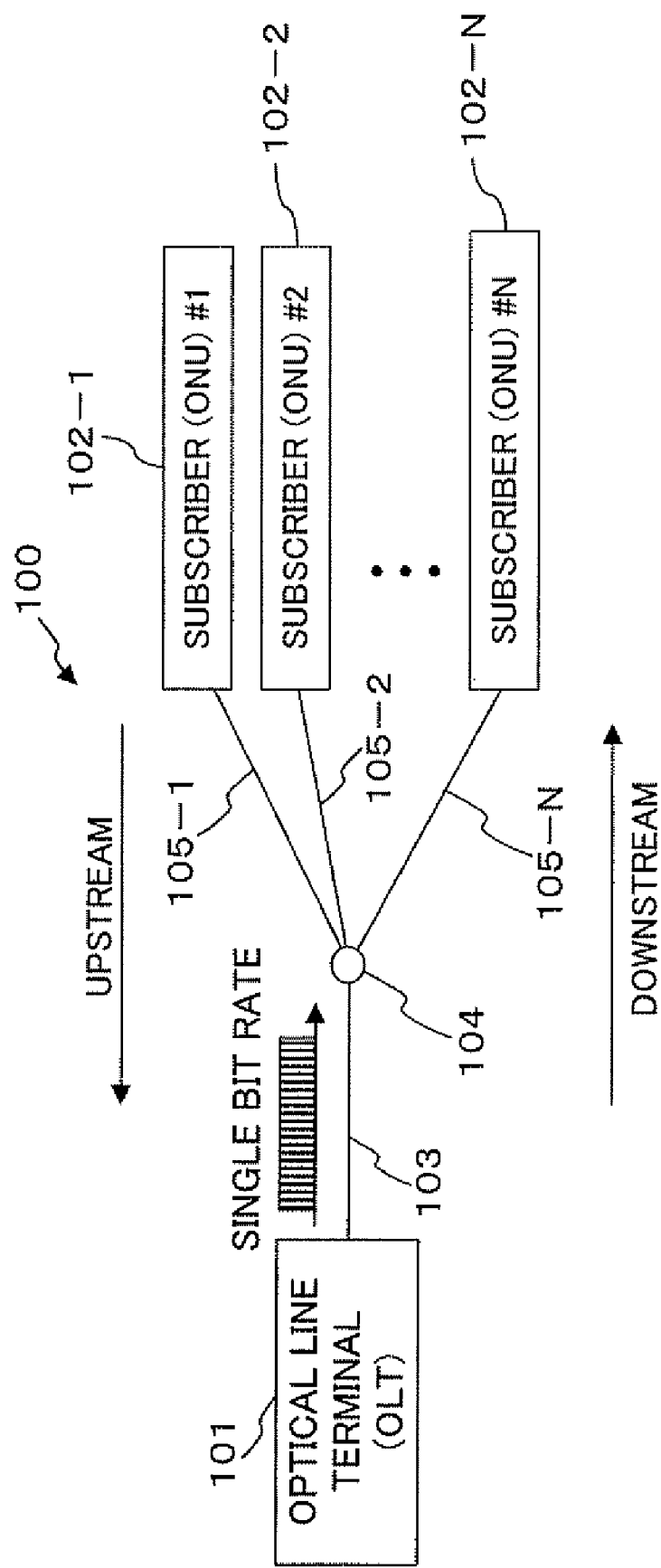
FIG. 12 is a diagram showing a form of a communication network using a PON system.

On the other hand, as shown in FIG. 11, the ONU 2A-2 to 2A-N (hereinafter may be referred to as a high-speed ONU) for the high-speed subscribers #2 to #N is comprised of the WDM coupler 21, O/E conversion part 22, Mdown frequency dividing circuit 23, frame synchronization/management information processing part 24, received data processing part 25, timing controlling part 26, transmission data processing part 27, and E/O conversion part 28 like in the first embodiment, and also a rate reconversion part 291 for connecting to an interface of 10 GbE and a rate conversion part 292.

Here, in the ONU 2A-1 shown in FIG. 10, the WDM coupler 14 is used to demultiplex a downstream frame (1.49 μm band light) from the optical fiber 13 for the O/E conversion part 15 and also to transmit data (1.31 μm band light) in the upstream direction from the E/O conversion part 20 to the optical fiber 13.

The O/E conversion part 15 is used to o/E-convert a downstream frame demultiplexed by the WDM coupler 14 from an optical signal to an electric signal. More specifically, if transmission data from the OLT 3 whose light intensity is modulated is input as an optical signal (1.49 μm band light) from the WDM coupler 14, the optical signal is converted to an analog electric signal having amplitude changes corresponding to light intensity thereof and then, in synchronization with the above basic operation clock A1 from a clock supply source (not shown), symbols "0" and "1" in the converted analog electric signal are identified and a digital electric signal is output as a identification result.

The frame synchronization/management information processing part 16 is used to detect frame synchronization information and management information included in the first data area 111A (See FIG. 8) of the downstream frame, and the timing controlling part 18 is used to control a reception processing timing by the received data processing part 17 based on data locations in frames addressed to the local station 2A-1 obtained from the detected frame synchronization information and management information and also to control a transmission processing timing by the transmission data processing part 19 based on a transmit timing obtained from the management information when transmitting data to the OLT 3A.

The received data processing part 17 and transmission data processing part 19 are used to perform data reception processing and data transmission processing respectively under control of the timing controlling part 18 according to the clock A1, which is the basic operation clock for the ONU 2A-1.

Then, the E/O conversion part 20 is used to E/O-convert data in the upstream direction from the transmission data processing part 19 from an electric signal to an optical signal.

With the configuration described above, the WDM coupler 14 in the ONU 2A-1 demultiplexes a downstream frame transmitted from the OLT 3A via the optical fiber 13 and the O/E conversion part 15 O/E-converts the demultiplexed frame. Then, the frame synchronization/management information processing part 16 detects frame synchronization information and management information in the downstream frame at the clock A1, which is the basic operation clock of the ONU 2A-1, and the timing controlling part 18 performs timing control of the received data processing part 17 according to the detected frame synchronization information to extract downstream data by performing reception processing of data signals addressed to the local station 2A-1 in a normal receiving timing.

Upstream data from a user, on the other hand, is transmitted to the OLT 3A in a normal transmit timing while the timing controlling part 18 performs the timing control of the transmission data processing part 19 according to the detected management information. The upstream data is E/O-converted by the E/O conversion part 20 to be multiplexed to the optical fiber 13 by the WDM coupler 14 for transmission to the OLT 3A.

By configuring the ONU 2A-1 as described above, reception processing of only data of the bit rate A1 addressed to the local station 2A-1 can correctly (normally) be performed without performing reception processing of data of the bit rate At2 in a downstream frame transmitted from the OLT 3A.

Reception processing is normally performed in a normal timing according to frame synchronization information to receive only data signals addressed to the local stations 2A-1, but if the frame synchronization information cannot be detected for some reason, the ONU 2A-1 operating at the clock A1 can catch data of the bit rate At2 only as noise, ensuring privacy.

Therefore, the existing ONU 2A-1 for the bit rate A1 can still receive data of the bit rate A1 correctly (normally) even if data of the bit rate A1 and data of the bit rate A2 exist in a downstream frame without modifying the ONU 2A-1 (upgrading or equipment renewal) at all.

The high-speed ONU 2A-2 to 2A-N shown in FIG. 11, on the other hand, operates (performs reception processing) using the clock At2 as a basic clock thereof and the WDM coupler 21 and the E/O conversion part 28 are the same as the WDM coupler 14 and the E/O conversion part 20 described above.

The O/E conversion part 22 is used to O/E-convert a downstream frame demultiplexed by the WDM coupler 21 from an optical signal to an electric signal. More specifically, if transmission data from the OLT 3A whose light intensity is modulated is input as an optical signal (1.49 μm band light) from the WDM coupler 21, the optical signal is converted to an analog electric signal having amplitude changes corresponding to light intensity thereof and then, in synchronization with the above basic operation clock At2 from a clock supply source (not shown), symbols "0" and "1" in the converted analog electric signal are identified and a digital electric signal is output as a identification result.

The Mdown frequency dividing circuit 23 is used to Mdown-divide (divided by 8 in this case) the basic operation clock (clock At2) of the high-speed ONU 2A-2 to 2A-N and the frame synchronization/management information processing part 24 is used to detect frame synchronization information and management information included in the first data area 111A (See FIG. 8) of the time division multiplex signal 110A (downstream frame). That is, with cooperation between the Mdown frequency dividing circuit 23 and frame synchronization/management information processing part 24, reception processing of downstream frames from the o/E conversion part 22 is performed in an Mdown-bit cycle and also frame synchronization information and management information included in the first data area 111A of the downstream frames are detected.

The timing controlling part 26 is used to control a reception processing timing by the received data processing part 25 based on data locations in frames addressed to the local stations 2A-2 to 2A-N obtained from the detected frame synchronization information and management information and also to control a transmission processing timing by the transmission data processing part 27 based on a transmit timing obtained from the management information when transmitting data to the OLT 3A.

The received data processing part 25 and transmission data processing part 27 are used, as described above, to perform data reception processing and data transmission processing respectively under control of the timing controlling part 26 according to the clock At2, which is the basic operation clock for the ONU 2A-2 to 2A-N.

The rate reconversion part 291 is used, after a signal having the bit rate At2, which is a rate converted by the rate conversion part 31A in the OLT 3A described above, being input by the received data processing part 25, to reconvert the signal to the original bit rate A2=10.3125 Gb/s to cause the signal to connect to the interface of 10 GbE. The rate conversion part 292 is used, as pre-processing before transmission, to convert the rate of a signal having the bit rate A2 to be transmitted to the OLT 3A to the bit rate At2=10 Gb/s before supplying the signal to the transmission data processing part 27.

With the configuration described above, the WDM coupler 21 in the ONU 2A-2 to 2A-N demultiplexes a downstream frame transmitted from the OLT 3A via the optical fiber 13 and the O/E conversion part 22 O/E-converts the demultiplexed frame.

Then, the frame synchronization/management information processing part 24 detects frame synchronization information and management information in the downstream frame in the Mdown-bit cycle (that is, at the clock A1) while the Mdown frequency dividing circuit 23 Mdown (=8)—divides the clock At2, which is the basic operation clock of the ONU 2A-2 to 2A-N (See FIG. 6). Further, the timing controlling part 26 performs timing control of the received data processing part 25 according to the detected frame synchronization information to extract downstream data by performing reception processing of data signals addressed to the local station 2A-N in a normal receiving timing.

The rate reconversion part 291 reconverts, after a signal having a received signal of the bit rate At2 from the received data processing part 25 being input, the signal to the bit rate A2=10.3125 Gb/s before outputting the signal. This makes it possible to cause a downstream signal transmitted at 10 Gb/s to connect to the interface of 10 GbE in the optical fibers 11 and 13, which are transmission lines, and the branching/multiplexing coupler 12.

Upstream data having the bit rate A2 from a user, on the other hand, after being converted to the bit rate At2 by the rate conversion part 292, is supplied to the transmission data processing part 27 as transmission data. Then, the timing controlling part 26 performs timing control of the transmission data processing part 27 according to the detected frame synchronization information so that the transmission data processing part 27 can transmit an optical signal addressed to the OLT 3A in a normal transmission timing. The upstream data is E/O-converted by the E/O conversion part 28 to be multiplexed to the optical fiber 13 by the WDM coupler 21 for transmission to the OLT 3.

Therefore, the ONU 2A-2 to 2A-N being provided with the Mdown frequency dividing circuit 23, rate reconversion part 291, and rate conversion part 292, even when attempting to transmit, along with a data signal (such as frame synchronization information and management information) of the bit rate A1, data of the bit rate A2, which is not related to the bit rate A1 as a multiple of a natural number, can correctly (normally) perform reception processing of data of the high-speed bit rate At2, which is a rate converted from the bit rate A2 by a transmitting side, before the data being reconverted to the original bit rate A2, and so the configuration becomes simpler even if a plurality of bit rates are not related to each other as multiples of natural numbers so that existence of ONUs for which different bit rates are set is allowed.

According to the second embodiment, as described above, the OLT 3A constitutes a time division multiplex optical signal composed of the first data area into which signals having the bit rate Ai addressed to a plurality of ONU 2A are input and, after performing a rate conversion of signals addressed to the ONUs 2A-2 to 2A-N to which at least one bit rate Aj [j∈i] belonging to the bit rates Ai of the input signals is set to the bit rate Atj so that bit rates of signals transmitted to the plurality of ONU 2A are related to each other as multiples of natural numbers, including frame synchronization information and the second data area in which packets addressed to each ONU 2A of the communication bit rates Ai [i≠j] and Atj, which are now related to each other as multiples of natural numbers, are time division multiplexed and transmits the time division multiplex optical signal to the plurality of ONU 2A via the branching/multiplexing coupler 12, and at the same time, each of the plurality of ONU 2A performs reception processing of content in the first data area 111A of the time division multiplex optical signal from the branching/multiplexing coupler 12 at a bit rate corresponding to a common divisor of values of the communication bit rates Ai [i≠j] and Atj, which are now related to each other as multiples of natural numbers and detects the frame synchronization information in the first data area 111A, and based on the detected frame synchronization information, performs reception processing of packets addressed to the optical subscriber in the second data area 112A of the time division multiplex optical signal in bits at the set communication bit rates Ai [i≠j] and Atj, while the ONUs 2A-2 to 2A-N that have performed the reception processing of packets whose rate had been converted to the bit rate Atj in the OLT 3A converts the rate of the packets of the bit rate Atj to its original bit rate Aj, and thus, even if bit rate values of the PON system 1A are not related to each other as a multiple of a natural number, the bit rate values can be made to be related as a multiple of a natural number by performing a rate conversion of one bit rate and so if the ONU 2A-1 to 2A-N are first accommodated for which the bit rate A1 is set and then an ONU is added for which the bit rate A2, which is not related to A1 as a multiple of a natural number, is set, or the existing ONU 2A-2 to 2A-N are connected to an interface of A2, which is a different bit rate of signal from A1 and is not related to each other as a multiple of a natural number, particularly a transmit timing of signal from the ONU 2 in the upstream transmission direction and a receiving timing on an OLT 3 side can easily be matched while minimizing specification changes in the OLT 3 and ONU 2A-1 to 2A-N, making system construction easier.

Further, by upgrading only the ONU 2A-2 to 2A-N including a rate conversion function that need services of the bit rate A2 while leaving the ONU 2A-1 for which optical signals (services) of the bit rate A1 are sufficient (in other words, data of the bit rate A2 is not needed) as it is (without upgrading), communication in which optical signals of the bit rate A1 and those of the bit rate At2 exist can easily be realized and thus, upgrade costs of the ONU 2A and manpower required for the upgrading can significantly be reduced.

Also, since the upgraded ONU 2A-2 to 2A-N can normally perform processing of signals of the bit rate A1 by reception processing in the Mdown-bit cycle, compatibility with existing systems can be ensured. At this point, since the Mdown is a natural number and the bit rate At2 can be made a multiple of a natural number of the bit rate A1, the Mdown frequency dividing circuit 23 can be realized as a simple circuit configuration, contributing to a reduced size of a circuit structure and reduced costs.

Further, since the OLT 3A performs reception processing of optical signals from a WDM coupler 6 at a clock frequency corresponding to the bit rate At2 to establish bit synchronization, and based on a specified transmit timing for each ONU 2A, performs reception processing of optical signals of the bit rate A1 in the Mup-bit cycle and reception processing of optical signals of the bit rate A2 in bits, reception processing of optical signals of the bit rate A1 and those of the bit rate A2 can each correctly be performed by a simple configuration without needing to establish synchronization by optical signal of each rate.

Also, by means of the rate conversion and rate reconversion functions of the OLT 3 and ONU 2A-2 to 2A-N (See numerals 31A, 291, and 292), even when transmitting signals of a plurality of bit rates whose bit rate values are not related to each other as multiples of natural numbers like a 1 GbE signal and a 10 GbE signal, the bit rate values can be made to be related to each other as multiples of natural numbers by performing a rate conversion of at least one bit rate and thus, transmit/receiving timings of both the OLT 3A and ONU 2A can be matched without changing specifications of the existing ONU 2A-1 at all.

[C] Others

Despite the embodiments described above, various modifications can be made without departing from the spirit of the present invention.

For example, transmission of two different bit rates A1 and A2 was described for each of the above embodiments, but according to the present invention, a system can also be constructed by following each embodiment described above when three or more different bit rates Ai (i is an integer from 1 to 3 or greater) are transmitted.

Further, a person skilled in the art can manufacture an apparatus according to the present invention after disclosure of the embodiments described above.

What is claimed is:

1. A multiple bit rate optical communication method in an optical communication system having an optical line terminal, a plurality of optical network units, and a branching/multiplexing means for branching an optical signal from the optical line terminal to the plurality of optical network units and for multiplexing optical signals from the plurality of optical network units for output to the optical line terminal in which k [k is an integer equal to or greater than 2] different communication bit rates Ai [i=1, . . . , k] set for the plurality of optical network units exist, wherein the optical line terminal constitutes a time division multiplex optical signal composed of a first data area having, if positive minimal multiples whose multiple operation values on the bit time lengths 1/Ai for the plurality of communication bit rates Ai become common are minimal multiples ai respectively, the bit rate Ai/ai and including frame synchronization information and a second data area in which packets addressed to each optical network unit of the communication bit rate Ai are time division multiplexed and transmits the time division multiplex optical signal to the plurality of optical network units via the branching/multiplexing means, and at the same time, each of the plurality of optical network units performs reception processing of content of the first data area of the time division multiplex optical signal from the branching/multiplexing means in an ai-bit cycle corresponding to the bit rate Ai set for the optical network unit and detects the frame synchronization information in the first data area, and based on the detected frame synchronization information, performs reception processing of packets addressed to a relevant optical subscriber in the second data area of the time division multiplex optical signal in bits.

2. The multiple bit rate optical communication method according to claim 1, wherein each optical network unit reads the first data area in units of a number of bits of the ai corresponding to the bit rate Ai set for the optical network unit after identifying the time division multiplex optical signal at the communication bit rate Ai set for the optical network unit and converting the optical signal to a digital electric signal.

3. The multiple bit rate optical communication method according to claim 1, wherein the optical line terminal assigns a receiving timing of packets addressed to each optical network unit in the second data area by each optical network unit so that the receiving timing becomes a timing synchronized with a clock frequency corresponding to a value obtained by dividing the communication bit rate Ai by the ai through the frame synchronization information included in the first data area of the time division multiplex optical signal.

4. The multiple bit rate optical communication method according to claim 1, wherein management information instructing a transmit timing of an optical signal from each of the plurality of optical network units to the optical line terminal is included in the first data area of the time division multiplex optical signal, each of the plurality of optical network units transmits the optical signal of the set communication bit rate Ai to the optical line terminal via the branching/multiplexing means in the transmit timing assigned by the optical line terminal through the management information, the optical line terminal establishes bit synchronization with each of optical signals from the plurality of optical network units transmitted via the branching/multiplexing means in a receiving timing corresponding to the transmit timing of the optical network unit in the management information and performs received signal processing of each of the optical signals from the plurality of optical network units with which the bit synchronization has been established at the corresponding communication bit rate Ai.

5. The multiple bit rate optical communication method according to claim 4, wherein both a time slot for each optical network unit assigned to the time division multiplex optical signal from the optical line terminal and an optical signal transmitted from each optical network unit are a packet with a number of bits obtained by multiplying the minimal multiple ai at the communication bit rate Ai set for the optical network unit by any natural number.

6. The multiple bit rate optical communication method according to claim 4, wherein the optical line terminal assigns the transmit timing of optical signals from each optical network unit to the optical line terminal as well as the receiving timing of packets addressed to each optical network unit in the second data area by each optical network unit so that both the timings become a timing synchronized with a clock frequency corresponding to a value obtained by dividing the communication bit rate Ai by the ai through the frame synchronization information and the management information included in the first data area of the time division multiplex optical signal.

7. The multiple bit rate optical communication method according to claim 4, wherein the optical line terminal sequentially assigns the transmit timing of optical signals from the plurality of optical network units to the optical line terminal by inserting an interval of a time period obtained by multiplying a common multiple operation value ai/Ai to the bit time length 1/Ai by any natural number as a guard time.

8. The multiple bit rate optical communication method according to claim 4, wherein in a timing synchronized with a clock frequency corresponding to a value obtained by dividing the communication bit rate Ai by the ai, the optical line terminal establishes the bit synchronization with each of the optical signals transmitted from the plurality of optical network units via the branching/multiplexing means and performs the received signal processing of each of the optical signals from the plurality of optical network units for which the bit synchronization has been established at the corresponding communication bit rate Ai.

9. A multiple bit rate optical communication method in an optical communication system having an optical line terminal, a plurality of optical network units, and a branching/multiplexing means for branching an optical signal from the optical line terminal to the plurality of optical network units and for multiplexing optical signals from the plurality of optical network units for output to the optical line terminal in which k [k is an integer equal to or greater than 2] different communication bit rates Ai [i=1, . . . , k], which are not related to each other as multiples of natural numbers, set for the plurality of optical network units exist, wherein the optical line terminal constitutes a time division multiplex optical signal composed of a first data area into which signals having the bit rate Ai addressed to the plurality of optical network units are input and, after performing a rate conversion of signals addressed to an optical network unit to which at least one bit rate Aj [j∈i] belonging to the bit rates Ai of the input signals is set to the bit rate Atj so that bit rates of signals transmitted to the plurality of optical network units are related to each other as multiples of natural numbers, including frame synchronization information and a second data area in which packets addressed to each optical network unit of the communication bit rates Ai [i≠j] and Atj, which are now related to each other as multiples of natural numbers, are time division multiplexed and transmits the time division multiplex optical signal to the plurality of optical network units via the branching/multiplexing means, and at the same time, each of the plurality of optical network units performs reception processing of content of the first data area of the time division multiplex optical signal from the branching/multiplexing means at a bit rate corresponding to a common divisor of values of the communication bit rates Ai [i≠j] and Atj, which are now related to each other as multiples of natural numbers, and detects the frame synchronization information in the first data area, and based on the detected frame synchronization information, performs reception processing of packets addressed to the relevant optical subscriber in the second data area of the time division multiplex optical signal in bits at the set communication bit rates Ai [i≠j] and Atj, while the optical network units that have performed the reception processing of packets whose rate had been converted to the bit rate Atj in the optical line terminal perform a rate conversion of the packets of the bit rate Atj to their original bit rate Aj.

10. The multiple bit rate optical communication method according to claim 9, wherein management information instructing a transmit timing of an optical signal from each of the plurality of optical network units to the optical line terminal is included in the first data area of the time division multiplex optical signal and when transmitting optical signals from the plurality of optical network units to the optical line terminal, after making bit rates of signals transmitted from the plurality of optical network units to the optical line terminal related to each other as multiples of natural numbers by converting, in an optical network unit to which at least one bit rate Aj [j∈i] belonging to the bit rates Ai is set, the bit rate Aj of data to be transmitted to the optical line terminal to the bit rate Atj, each of the plurality of optical network units transmits an optical signal at the communication bit rate Ai [i≠j] or Atj to the optical line terminal via the branching/multiplexing means in the transmit timing assigned by the optical line terminal through the management information, while the optical line terminal establishes bit synchronization with each of signals transmitted as an optical signal from the plurality of optical network units via the branching/multiplexing means in a receiving timing corresponding to the transmit timing of the optical network unit in the management information and performs received signal processing of each of the signals from the plurality of optical network units for which the bit synchronization has been established at the corresponding communication bit rate Ai [i≠j] or Atj and at the same time, regarding signals for which rate conversion to the bit rate Atj had been performed in the optical network unit among signals for which reception processing has been performed, a rate reconversion of such signals is performed from the bit rate Atj to the original bit rate Aj.

11. An optical line terminal in an optical communication system having an optical line terminal, a plurality of optical network units, and a branching/multiplexing means for branching an optical signal from the optical line terminal to the plurality of optical network units and for multiplexing optical signals from the plurality of optical network units for output to the optical line terminal in which k [k is an integer equal to or greater than 2] different communication bit rates Ai [i=1, . . . , k] set for the plurality of optical network units exist, comprising:

a multiple signal constituting part constituting a time division multiplex optical signal composed of a first data area having, if positive minimal multiples whose multiple operation values on the bit time lengths 1/Ai for the plurality of communication bit rates Ai become common are minimal multiples ai respectively, the bit rate Ai/ai and including frame synchronization information, and a second data area in which packets addressed to each optical network unit of the communication bit rate Ai are time division multiplexed; and a transmission part transmitting the time division multiplex optical signal constituted by the multiple signal constituting part to the plurality of optical network units via the branching/multiplexing means.

12. An optical network unit in an optical communication system having the optical line terminal according to claim 11, a plurality of optical network units, and a branching/multiplexing means for branching an optical signal from the optical line terminal to the plurality of optical network units and for multiplexing optical signals from the plurality of optical network units for output to the optical line terminal in which k [k is an integer equal to or greater than 2] different communication bit rates Ai [i=1, . . . , k] set for the plurality of optical network units exist, comprising:

a synchronization information detecting part which performs reception processing of content in the first data area of the time division multiplex optical signal input from the optical line terminal via the branching/multiplexing means in the ai-bit cycle corresponding to the bit rate Ai set for the optical network unit and detects the frame synchronization information in the first data area; and a reception processing part which performs, based on the frame synchronization information detected by the synchronization information detecting part, reception processing of packets addressed to the relevant optical subscriber in the second data area of the time division multiplex optical signal in bits.

13. An optical line terminal in an optical communication system having an optical line terminal, a plurality of optical network units, and a branching/multiplexing means for branching an optical signal from the optical line terminal to the plurality of optical network units and for multiplexing optical signals from the plurality of optical network units for output to the optical line terminal in which k [k is an integer equal to or greater than 2] different communication bit rates Ai [i=1, . . . , k], which are not related to each other as multiples of natural numbers, set for the plurality of optical network units exist, comprising:

a rate conversion part into which signals having the bit rate Ai addressed to the plurality of optical network units are input and by which bit rates of signals transmitted to the plurality of optical network units are made to be related to each other as multiples of natural numbers by performing a rate conversion of signals addressed to an optical network unit to which at least one bit rate Aj [j∈i] belonging to the bit rates Ai of the input signals is set to a bit rate Atj;

a multiple signal constituting part constituting a time division multiplex optical signal composed of a first data area including frame synchronization information and a second data area in which packets addressed to each optical network unit of the communication bit rates Ai [i≠j] and Atj, which are now related to each other as multiples of natural numbers by the rate conversion in the rate conversion part, are time division multiplexed; and a transmission part transmitting the time division multiplex optical signal constituted by the multiple signal constituting part to the plurality of optical network units via the branching/multiplexing means.

14. An optical network unit in an optical communication system having the optical line terminal according to claim 13, a plurality of optical network units, and a branching/multiplexing means for branching an optical signal from the optical line terminal to the plurality of optical network units and for multiplexing optical signals from the plurality of optical network units for output to the optical line terminal in which k [k is an integer equal to or greater than 2] different communication bit rates Ai [i=1, . . . , k], which are not related to each other as multiples of natural numbers, set for the plurality of optical network units exist, comprising:

a synchronization information detecting part which performs reception processing of content in the first data area of the time division multiplex optical signal input from the optical line terminal via the branching/multiplexing means at a bit rate corresponding to a common divisor of values of the communication bit rates Ai [i≠j] and Atj, which are now related to each other as multiples of natural numbers, and detects the frame synchronization information in the first data area;

a reception processing part which performs, based on the detected frame synchronization information, reception processing of packets addressed to the relevant optical subscriber in the second data area of the time division multiplex optical signal at the set communication bit rates Ai [i≠j] and Atj in bits; and a rate reconversion part which performs a rate conversion of packets whose rate conversion to the bit rate Atj has been performed in the optical line terminal to their original bit rate Aj in the optical network unit which has performed the reception processing.

* * * * *